(12) United States Patent
Guttag et al.

(10) Patent No.: US 11,733,980 B2
(45) Date of Patent: Aug. 22, 2023

(54) APPLICATION IMPLEMENTATION AND BUFFER ALLOCATION FOR A DATA PROCESSING ENGINE ARRAY

(71) Applicant: Xilinx, Inc., San Jose, CA (US)

(72) Inventors: Brian Guttag, San Jose, CA (US); Satish B. Sivaswamy, Fremont, CA (US); Nitin Deshmukh, Monroe, WA (US)

(73) Assignee: Xilinx, Inc., San Jose, CA (US)

( * ) Notice: Subject to any disclaimer, the term of this patent is extended or adjusted under 35 U.S.C. 154(b) by 59 days.

(21) Appl. No.: 17/643,622

(22) Filed: Dec. 10, 2021

(65) Prior Publication Data

US 2023/0185548 A1  Jun. 15, 2023

(51) Int. Cl.
*G06F 9/44* (2018.01)
*G06F 8/41* (2018.01)

(52) U.S. Cl.
CPC .................................... *G06F 8/433* (2013.01)

(58) Field of Classification Search
None
See application file for complete search history.

(56) References Cited

U.S. PATENT DOCUMENTS

| | | | |
|---|---|---|---|
| 7,299,439 B1 | 11/2007 | Slonim et al. | |
| 7,451,422 B1 | 11/2008 | Slonim et al. | |
| 7,480,884 B1 | 1/2009 | Slonim et al. | |
| 7,958,480 B1 | 6/2011 | Slonim et al. | |
| 8,010,924 B1 | 8/2011 | Slonim et al. | |
| 8,091,060 B1 | 1/2012 | Tom et al. | |
| 9,043,774 B2 * | 5/2015 | Bently | G06F 8/30 717/157 |
| 10,747,690 B2 * | 8/2020 | Bilski | G06F 15/17331 |
| 10,891,132 B2 * | 1/2021 | Gupta | G06F 9/5011 |
| 2018/0196958 A1 * | 7/2018 | Chari | G06F 21/577 |
| 2018/0239615 A1 * | 8/2018 | Ravid | G06F 16/1794 |
| 2021/0133324 A1 * | 5/2021 | Chari | G06F 8/433 |
| 2021/0165664 A1 * | 6/2021 | Gould | G06F 16/9024 |
| 2022/0261365 A1 * | 8/2022 | Prabhakar | G06F 11/302 |

* cited by examiner

*Primary Examiner* — Anna C Deng
(74) *Attorney, Agent, or Firm* — Kevin T. Cuenot

(57) ABSTRACT

Implementing an application can include generating, from the application, a compact data flow graph (DFG) including load nodes, inserting, in the compact DFG, a plurality of virtual buffer nodes (VBNs) for each of a plurality of buffers of a data processing engine (DPE) array to be allocated to nets of the application, and, forming groups of one or more load nodes of the compact DFG based on shared buffer requirements of the loads on a per net basis. Virtual driver nodes (VDNs) that map to drivers of nets can be added to the compact DFG, where each group of the compact DFG is driven by a dedicated VDN. Connections between VDNs and load nodes through selected ones of the VBNs are created according to a plurality of constraints. The plurality of buffers are allocated to the nets based on the compact DFG as connected.

20 Claims, 14 Drawing Sheets

700

```
┌─────────────────────────────────────┐
│ Generating, from an application for │
│ a data processing engine array, a   │
│ compact data flow graph including   │
│ load nodes corresponding to loads   │
│ of nets of the application          │
│ 702                                 │
└─────────────────────────────────────┘
                  │
                  ▼
┌─────────────────────────────────────┐
│ For each net of a plurality of nets │
│ of the application, forming groups  │
│ of load nodes based on shared       │
│ buffer requirements of the physical │
│ loads and adding a virtual driver   │
│ node to the compact data flow graph │
│ for each group, wherein each virtual│
│ driver node maps to a physical      │
│ driver of the data processing engine│
│ array                               │
│ 704                                 │
└─────────────────────────────────────┘
                  │
                  ▼
┌─────────────────────────────────────┐
│ Create connections between the      │
│ virtual driver nodes and the load   │
│ nodes through the virtual buffer    │
│ nodes to fully connect the compact  │
│ data flow graph                     │
│ 706                                 │
└─────────────────────────────────────┘
                  │
                  ▼
┌─────────────────────────────────────┐
│ Allocate physical buffers to the    │
│ plurality of nets of the application│
│ based on the compact data flow graph│
│ as connected                        │
│ 708                                 │
└─────────────────────────────────────┘
```

Generate an Integer Linear Programming formulation including a plurality of equations and one or more cost functions for allocating buffers to nets of the application using the compact data flow graph as connected
710

Allocate the physical buffers to the plurality of nets of the application by solving the Integer Linear Programming Formulation to specify a buffer allocation for each of the plurality of nets based on the one or more cost functions that minimize detour cost
712

Configure router to process loads of nets so that loads of a net with lower buffer requirements are routed prior to loads of the net with higher buffer requirements
714

Adjust cost measures to prefer using buffers that are already taken before adding a detour to take another buffer not yet taken
716

Route nets of application using the ordering of block 714 and the cost measures of block 716 while changing the ordering that nets are routed every one or more iterations
718

FIG. 7C

APPLICATION IMPLEMENTATION AND BUFFER ALLOCATION FOR A DATA PROCESSING ENGINE ARRAY

TECHNICAL FIELD

This disclosure relates to implementing an application using a data processing engine array and, more particularly, to buffer allocation for implementing the application using the data processing engine array.

BACKGROUND

Different types of integrated circuits (ICs) include one or more cores suited to perform various compute operations. These compute operations may relate to packet processing, cryptography, digital signal processing, image processing, or any of a variety of other operations. The IC, for example, may include a processor that includes a single core or multiple cores. In other arrangements, the IC may include an array of cores disposed in respective data processing engines (DPEs), where the DPEs are organized in a DPE array. The DPE array may have a hardened or fixed circuit architecture within the IC. In addition to cores, the DPE array may have a variety of other circuit resources including, but not limited to, memories, switches, direct memory access (DMA) engines, and the like. These resources, like the cores, may be disposed in respective DPEs of the DPE array.

An application to be implemented in a DPE array must be compiled for execution in the DPE array. The compilation process, in addition to generating object code for execution by the cores of the array, entails a variety of operations such as mapping kernels of the application to particular cores of the DPE array and routing data paths, e.g., nets, between the kernels using the other circuit resources of the DPE array. As part of compilation, buffers must be allocated along certain data paths within the DPE array to ensure that the application executes efficiently and avoids deadlock conditions.

SUMMARY

In one or more example implementations, a method can include generating, from an application for a data processing engine array, a compact data flow graph including load nodes corresponding to loads of nets of the application. The method can include inserting, in the compact data flow graph, a plurality of virtual buffer nodes for each buffer of a plurality of buffers of the data processing engine array to be allocated to the nets. For each net, the method can include forming groups of one or more of the load nodes of the compact data flow graph based on shared buffer requirements of the loads. The method can include adding to the compact data flow graph one or more virtual driver nodes that map to the drivers of the nets such that each group of the compact data flow graph is driven by a dedicated virtual driver node. The method also can include creating connections between the virtual driver nodes and the load nodes through selected ones of the virtual buffer nodes according to a plurality of constraints. The method can include allocating the plurality of buffers to the nets based on the compact data flow graph as connected.

In one or more example implementations, a system includes one or more processors configured to initiate operations. The operations can include generating, from an application for a data processing engine array, a compact data flow graph including load nodes corresponding to loads of nets of the application. The operations can include inserting, in the compact data flow graph, a plurality of virtual buffer nodes for each buffer of a plurality of buffers of the data processing engine array to be allocated to the nets. For each net, the operations can include forming groups of one or more of the load nodes of the compact data flow graph based on shared buffer requirements of the loads. The operations can include adding to the compact data flow graph one or more virtual driver nodes that map to the drivers of the nets such that each group of the compact data flow graph is driven by a dedicated virtual driver node. The operations also can include creating connections between the virtual driver nodes and the load nodes through selected ones of the virtual buffer nodes according to a plurality of constraints. The operations can include allocating the plurality of buffers to the nets based on the compact data flow graph as connected.

In one or more example implementations, a computer program product includes one or more computer readable storage media, and program instructions collectively stored on the one or more computer readable storage media. The program instructions are executable by computer hardware to initiate operations. The operations can include generating, from an application for a data processing engine array, a compact data flow graph including load nodes corresponding to loads of nets of the application. The operations can include inserting, in the compact data flow graph, a plurality of virtual buffer nodes for each buffer of a plurality of buffers of the data processing engine array to be allocated to the nets. For each net, the operations can include forming groups of one or more of the load nodes of the compact data flow graph based on shared buffer requirements of the loads. The operations can include adding to the compact data flow graph one or more virtual driver nodes that map to the drivers of the nets such that each group of the compact data flow graph is driven by a dedicated virtual driver node. The operations also can include creating connections between the virtual driver nodes and the load nodes through selected ones of the virtual buffer nodes according to a plurality of constraints. The operations can include allocating the plurality of buffers to the nets based on the compact data flow graph as connected.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 7A illustrates an example method of implementing an application for a DPE array.

FIG. 7B illustrates an example implementation of block 708 of FIG. 7A using ILP.

FIG. 7C illustrates an example implementation of block 708 of FIG. 7A using a router adapted to use a compact DFG.

DETAILED DESCRIPTION

Figure 1:
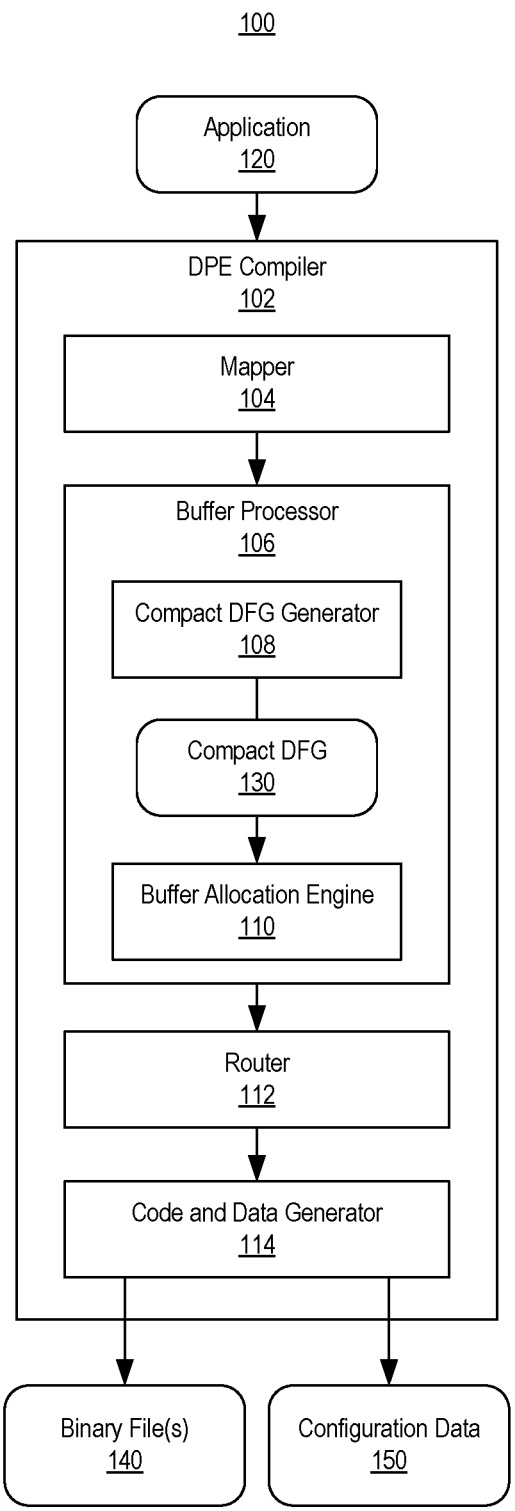
FIG. 1 illustrates certain operative features of an Electronic Design Automation (EDA) system.

This disclosure relates to implementing an application using a data processing engine (DPE) array and, more particularly, to buffer allocation for implementing the application using the DPE array. A DPE array includes a plurality of DPEs. Each DPE is implemented as a hardened circuit block or tile. Each DPE may include a core capable of executing program code and a memory module. Each DPE may include one or more dedicated buffers.

An application developed to execute on a DPE array includes one or more functions referred to as "kernels." The kernels, for example, may be user-specified (e.g., custom) or obtained from a library of kernels. The kernels, whether from a library or user-specified, may implement any of a variety of functions, including commonly used functions. These functions may be specific to a particular domain such as image processing, communications, cryptography, or the like. In general, the application may be specified as a data flow graph (DFG) including a plurality of nodes representing the kernels where the nodes are connected by edges representing the data paths between the kernels.

To implement the application on the DPE array, the application is compiled. Compilation typically includes mapping the kernels to different DPEs (e.g., cores of DPEs) of the DPE array for execution, allocating buffers to the various data paths, or nets, of the circuit design to ensure efficient execution of the application in the DPE array, and routing the data paths connecting the kernels as mapped. Compilation also includes generating object code corresponding to the kernels that may be executed by the cores to which the kernels have been mapped and generating configuration data that implements the buffer allocation and routes.

In accordance with the inventive arrangements described within this disclosure, methods, systems, and computer program products are provided for implementing an application within a DPE array. The application may be implemented through compilation for execution by DPEs of the DPE array. As part of the compilation, an Electronic Design Automation (EDA) system is capable of allocating buffers available in the DPE array to data flows, or nets, of the application. The EDA system is configured to implement a buffer allocation technique that, unlike other techniques employed by conventional routers, does not seek out the shortest path from source to load, but rather determines paths for nets that include an amount of buffering deemed necessary for the respective nets. The technique may also seek to minimize a detour cost attributable, at least in part, to inclusion of the buffers along the paths for the nets. The example implementations described within this disclosure enable an EDA system to insert buffers in nets of an application, where the buffers are inserted at optimally determined locations. The buffer allocation generated optimizes usage of buffers of the DPE array, promotes buffer sharing, and increases data throughput of the application.

In one or more example implementations, the EDA system is capable of constructing a compact DFG from the application. The compact DFG may include a plurality of nodes and edges connecting the plurality of nodes. In general, the compact DFG represents drivers, loads, and buffers of the application. In one aspect, the compact DFG may represent only drivers, loads, and buffers of the application. The compact DFG generated by the EDA system provides a foundation that may be used for allocating buffers to implement the application in the DPE array. The buffer allocation is an assignment of buffers of the DPE array to nets of the application. Because the buffers have physical locations on the IC including the DPE array, the buffer allocation specifies a topology for data paths that may be followed during routing.

In one or more example implementations, the buffer allocation may be performed by the EDA system using the compact DFG through generation of an Integer Linear Programming (ILP) formulation of the buffer allocation problem. The ILP formulation may specify a plurality of binary variables, constraints, and one or more cost functions. The EDA system is capable of determining values for the binary variables that meet the constraints of the ILP formulation while minimizing the one or more cost functions. The one or more cost functions, for example, may specify a detour cost. The ILP solution, e.g., the values of the variables for the ILP formulation determined that meet the constraints and minimize the cost function(s), specify a buffer allocation for nets of the application.

In one or more other example implementations, the compact DFG may serve as a foundation to allocate buffers to nets of the application using one or more other routing techniques. For example, a conventional router, e.g., a Maze Router, may be adapted to use the compact DFG where certain nodes contained in the compact DFG, e.g., virtual buffer nodes, are specified and interpreted by the router as shared resources. In such example implementations, the generation of the compact DFG facilitates use of a router, as adapted, to allocate buffers. Without utilizing the compact DFG and annotating certain nodes as shared resources as described herein, a conventional router seeks out the most direct path for nets. The most direct path for a net may not provide the amount of buffering necessary for a net for efficient execution of the application by the DPE array. Further aspects of the inventive arrangements are described below with reference to the figures.

FIG. 1 illustrates certain operative features of an EDA system 100. EDA system 100 may be implemented as a data processing system, e.g., a computer, executing suitable program code to perform the operations described within this disclosure. An example of a data processing system that may be used to implement EDA system 100 is described in connection with FIG. 18. In general, EDA system 100 is capable of processing an application that is intended for execution by a DPE array or other processor array of an IC to generate the data necessary to execute the application on the DPE array.

In the example of FIG. 1, EDA system 100 includes a software architecture including a DPE compiler 102 that is capable of implementing an application 120 in a DPE array. DPE compiler 102 may include a mapper 104, a buffer processor 106, a router 112, and a code and data generator 114. In general, DPE compiler 102 is capable of processing application 120 to generate a compact data flow graph (DFG) 130, one or more binary files 140, and configuration data 150.

Application 120 may be a user-specified application written in source code to specify a DFG. Application 120, for example, may specify one or more kernels intended to execute in different DPEs of the DPE array. Further, application 120 may specify connections, or edges, between the kernels representing data flows, or nets, between the kernels. Application 120 may be specified in a high-level programming language such as C/C++.

Mapper 104 is capable of mapping, or assigning, the kernels of application 120 to particular DPEs of the DPE array. Each kernel, for example, may function as a driver or a load for a given net of application 120. Mapper 104 may map more than one kernel to a same DPE depending on the throughput requirements of the application and the capabilities of the kernels. Buffer processor 106 is capable of allocating buffers to data paths, e.g., nets, of application 120. As noted, a buffer allocation specifies particular buffers, having defined locations in the DPE array and/or IC, and an ordering of such buffers to particular nets of application 120. Buffer processor 106 may include a compact DFG generator 108 and a buffer allocation engine 110. Compact DFG generator 108 is capable of generating compact DFG 130. Buffer allocation engine 110 is capable of operating on compact DFG 130 to allocate buffers to the nets.

In one or more example implementations, buffer allocation engine 110 may be implemented as an ILP engine that is capable of generating an ILP formulation based on compact DFG 130 and generating a solution to the ILP formulation that specifies a buffer allocation for application 120. In one or more other example implementations, buffer allocation engine 110 may be implemented as a router, e.g., a Maze Router, that is configured or adapted to operate on and interpret compact DFG 130 as described herein in greater detail below.

Router 112 is capable of generating routes for data paths, or nets, represented by edges of application 120 to connect drivers and loads within the DPE array using the buffer allocation generated by buffer processor 106. Code and data generator 114 is capable of generating the binary file(s) 140 and the configuration data 150. Binary file(s) 140 represent executable program code, e.g., object code, that may be executed by particular ones of the cores of the DPEs of the DPE array. The configuration data may specify settings for components within the DPE array that create the connectivity, or routes, and implement the buffer allocation among the DPEs. The binary file(s) 140 and configuration data 150 may be loaded into the appropriate memories and/or configuration registers of the DPE array to execute application 120 therein.

The DPE array used to execute application 120, as noted, may be hardened with each DPE including a variety of circuit components that must be allocated to application 120 and configured for application 120 to execute. These circuit components may include, but are not limited to, memory locks, direct memory access (DMA) engine channels, stream switches, and buffers. In addition to the operations described above, DPE compiler 102 is capable of generating, e.g., synthesizing, a main program for each core, e.g., binary file(s) 140, that schedules the kernels on the cores of the DPE array and implements the necessary locking mechanisms and data copy among buffers. DPE compiler 102 is also capable of generating control application programming interfaces (APIs) to control the initialization, execution, and termination of application 120 from a control application. The control application may be executed by a controller located in the same IC as the DPE array or in a different system (e.g., in a host data processing system communicatively linked to the DPE array).

Figure 2:
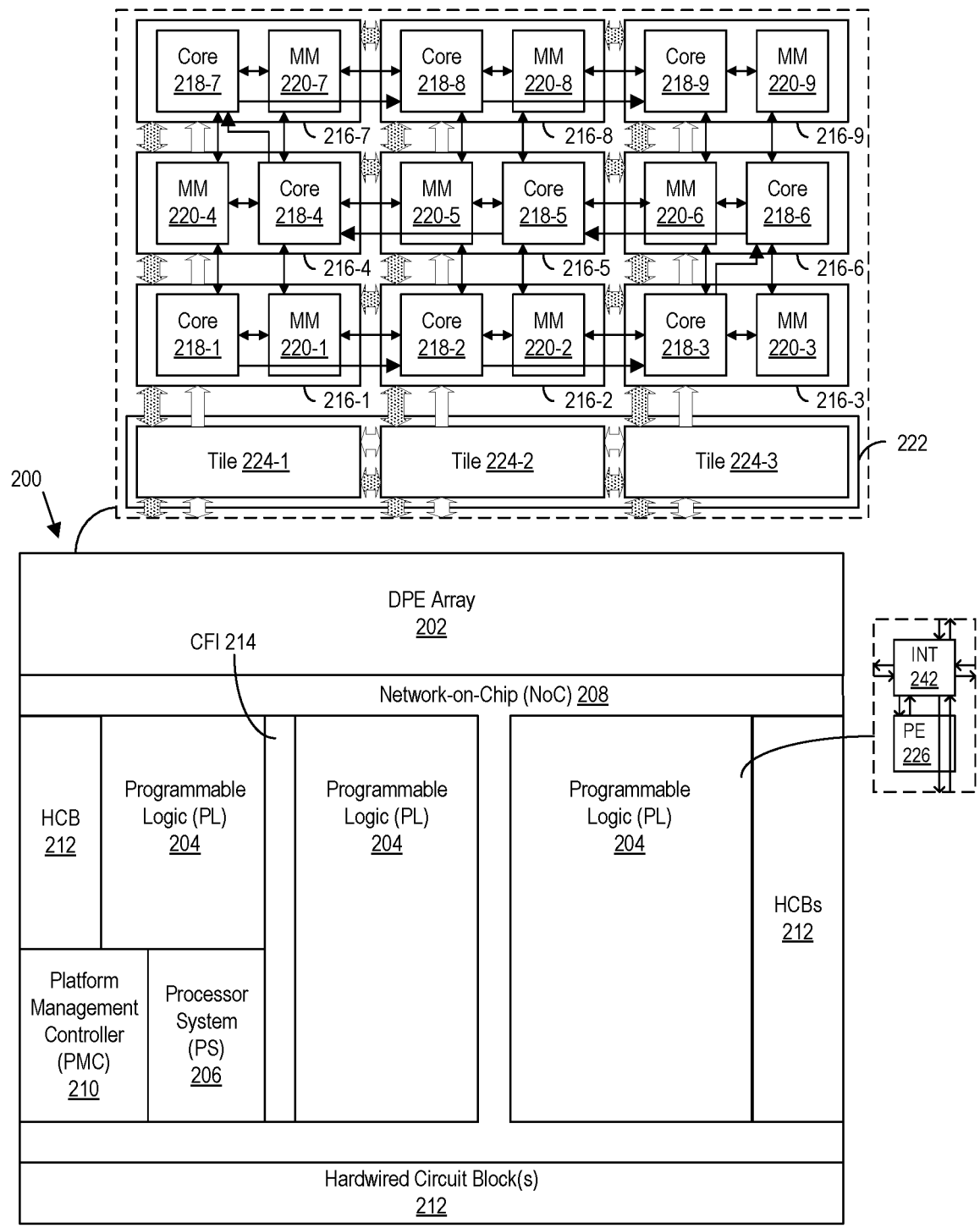
FIG. 2 illustrates an example architecture for an integrated circuit (IC) having a data processing engine (DPE) array.

FIG. 2 illustrates an example architecture for an IC 200 having a DPE array 202. IC 200 is an example of a programmable IC and an adaptive system. In one aspect, IC 200 is also an example of a System-on-Chip (SoC). In the example of FIG. 2, IC 200 is implemented on a single die provided within a single integrated package. In other examples, IC 200 may be implemented using a plurality of interconnected dies where the various programmable circuit resources illustrated in FIG. 2 are implemented across the different interconnected dies.

In the example, IC 200 includes DPE array 202, programmable logic (PL) 204, a processor system (PS) 206, a Network-on-Chip (NoC) 208, a platform management controller (PMC) 210, and one or more hardwired circuit blocks 212. A configuration frame interface (CFI) 214 is also included. It should be appreciated that the architecture of IC 200 is provided for purposes of illustration and not limitation. An IC for use with the inventive arrangements described herein may include DPE array 202 alone or in combination with any one or more of the various subsystems described or other types of circuits.

DPE array 202 is implemented as a plurality of interconnected and programmable DPEs 216. DPEs 216 may be arranged in an array. While DPEs 216 are programmable, DPEs 216 are hardened and are not formed of programmable logic. Each DPE 216 can include one or more cores 218 and a memory module (abbreviated "MM" in FIG. 2) 220. In one aspect, each core 218 is capable of executing program code stored in a core-specific program memory contained within each respective core (not shown). Cores 218 may be implemented using any of a variety of different processor architectures such as, for example, vector, single instruction-multiple data (SIMD), reduced instruction set computer (RISC), complex instruction set computer (CISC), or the like.

Each core 218 is capable of directly accessing the memory module 220 within the same DPE 216 and the memory module 220 of any other DPE 216 that is adjacent to the core 218 of the DPE 216 in the up, down, left, and right directions. For example, core 218-5 is capable of directly reading and/or writing (e.g., via respective memory interfaces not shown and without the use of DMA engines) memory modules 220-5, 220-8, 220-6, and 220-2. Core 218-5 sees each of memory modules 220-5, 220-8, 220-6, and 220-2 as a unified region of memory (e.g., as a part of the local memory accessible to core 218-5). This facilitates data sharing among different DPEs 216 in DPE array 202. In other examples, core 218-5 may be directly connected to memory modules 220 in other DPEs.

DPEs 216 are interconnected by programmable DPE interconnect circuitry. The programmable DPE interconnect circuitry may include one or more different and independent networks. For example, the programmable DPE interconnect circuitry may include a streaming network formed of streaming switches (not shown) that establish streaming connections shown with shaded arrows and a memory mapped network formed of memory mapped switches (not shown) that establish memory mapped connections shown with unshaded arrows. Cores 218 may communicate with memory modules 220 and/or other components that are not in adjacent DPEs or in the same DPE 216 by way of communicating through stream switches and/or DMA engines.

Loading configuration data into control registers of DPEs 216 by way of the memory mapped connections allows each DPE 216 and the components therein to be controlled independently. DPEs 216 may be enabled/disabled on a per-DPE basis. Each core 218, for example, may be configured to access the memory modules 220 as described or only a subset thereof to achieve isolation of a core 218 or a plurality of cores 218 operating as a cluster. Each streaming connection may be configured to establish logical connections between only selected ones of DPEs 216 to achieve isolation of a DPE 216 or a plurality of DPEs 216 operating as a cluster. Because each core 218 may be loaded with program code specific to that core 218, each DPE 216 is capable of implementing one or more different kernels therein.

In other aspects, the programmable DPE interconnect circuitry within DPE array 202 may include additional independent networks such as a debug network and/or an event broadcast network, each being independent (e.g., distinct and separate from) the streaming connections and the memory mapped connections. In some aspects, the debug network is formed of memory mapped connections and/or is part of the memory mapped network.

Cores 218 may be directly connected with adjacent cores 218 via core-to-core cascade connections. In one aspect, core-to-core cascade connections are unidirectional and direct connections between cores 218 as pictured. In another aspect, core-to-core cascade connections are bidirectional and direct connections between two or more cores 218. In general, core-to-core cascade connections generally allow the results stored in an accumulation register of a source core to be provided directly to an input of a target or load core. Activation of core-to-core cascade interfaces may also be controlled by loading configuration data, e.g., part of the compiled application 120, into control registers of the respective DPEs 216.

In an example implementation, DPEs 216 do not include cache memories. By omitting cache memories, DPE array 202 is capable of achieving predictable, e.g., deterministic, performance. Further, significant processing overhead is avoided since maintaining coherency among cache memories located in different DPEs 216 is not required. In a further example, cores 218 do not have input interrupts. Thus, cores 218 are capable of operating uninterrupted. Omitting input interrupts to cores 218 also allows DPE array 202 to achieve predictable, e.g., deterministic, performance.

SoC interface block 222 operates as an interface that connects DPEs 216 to other resources of IC 200. In the example of FIG. 2, SoC interface block 222 includes a plurality of interconnected tiles 224 organized in a row. In particular embodiments, different architectures may be used to implement tiles 224 within SoC interface block 222 where each different tile architecture supports communication with different resources of IC 200. Tiles 224 are connected so that data may be propagated from one tile to another bi-directionally. Each tile 224 is capable of operating as an interface for the column of DPEs 216 directly above and is capable of interfacing such DPEs 216 with components and/or subsystems of IC 200 including, but not limited to, PL 204 and/or NoC 208.

Tiles 224 are connected to adjacent tiles, to DPEs 216 immediately above, and to circuitry below using the streaming connections and the memory mapped connections as shown. Tiles 224 may also include a debug network that connects to the debug network implemented in DPE array 202. Each tile 224 is capable of receiving data from another source such as PS 206, PL 204, and/or another hardwired circuit block 212. Tile 224-1, for example, is capable of providing those portions of the data, whether application or configuration, addressed to DPEs 216 in the column above to such DPEs 216 while sending data addressed to DPEs 216 in other columns on to other tiles 224, e.g., 224-2 or 224-3, so that such tiles 224 may route the data addressed to DPEs 216 in their respective columns accordingly.

PL 204 is circuitry that may be programmed to perform specified functions. As an example, PL 204 may be implemented as field programmable gate array type of circuitry. PL 204 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 204 is highly configurable unlike hardened circuitry. Each programmable circuit block of PL 204 typically includes a programmable element 226 (e.g., a functional element) and a programmable interconnect 242. The programmable interconnects 242 provide the highly configurable topology of PL 204. The programmable interconnects 242 may be configured on a per wire basis to provide connectivity among the programmable elements 226 of programmable circuit blocks of PL 204 and is configurable on a per-bit basis (e.g., where each wire conveys a single bit of information) unlike connectivity among DPEs 216, for example, that may include multi-bit stream connections capable of supporting packet-based communications.

PS 206 is implemented as hardened circuitry that is fabricated as part of IC 200. PS 206 may be implemented as, or include, any of a variety of different processor types capable of executing program code. For example, PS 206 may be implemented as an individual processor, e.g., a single core capable of executing program code. In another example, PS 206 may be implemented as a multi-core processor. In still another example, PS 206 may include one or more cores, modules, co-processors, I/O interfaces, and/or other resources. PS 206 may be implemented using any of a variety of different types of architectures. Though PS 206 may include multiple cores, PS 206 is not considered an "array." Example architectures that may be used to implement PS 206 may include, but are not limited to, vector, SIMD, RISC, and/or CISC. Example implementations of PS 206 may include one or more ARM processors, x86 processors, graphics processing units (GPUs), mobile processors, DSPs, or combinations of the foregoing architectures and/or examples. In one or more example implementations, PS 206 may execute the control program discussed previously that controls execution of application 120 within DPE array 202.

NoC 208 is a programmable interconnecting network for sharing data between endpoint circuits in IC 200. The endpoint circuits can be disposed in DPE array 202, PL 204, PS 206, and/or selected hardwired circuit blocks 212. NoC 208 can include high-speed data paths with dedicated switching. In an example, NoC 208 includes one or more horizontal paths, one or more vertical paths, or both horizontal and vertical path(s). The arrangement and number of regions shown in FIG. 2 is merely an example. NoC 208 is an example of the common infrastructure that is available within IC 200 to connect selected components and/or subsystems.

Within NoC 208, the nets that are to be routed through NoC 208 are unknown until a user circuit design is created for implementation within IC 200. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of IC 200 (e.g., is hardwired) and, while not physically modifiable, may be programmed to establish connectivity between different master circuits and different slave circuits of a user circuit design. NoC 208, upon power-on, does not implement any application data paths or routes therein, but may provide default paths for loading configuration data into selected other subsystems. Once configured by PMC 210, however, NoC 208 implements data paths or routes between endpoint circuits.

PMC 210 is responsible for managing IC 200. PMC 210 is a subsystem within IC 200 that is capable of managing the other programmable circuit resources across the entirety of IC 200. PMC 210 is capable of maintaining a safe and secure environment, booting IC 200, and managing IC 200 during normal operations. For example, PMC 210 is capable of providing unified and programmable control over power-up, boot/configuration, security, power management, safety monitoring, debugging, and/or error handling for the different programmable circuit resources of IC 200 (e.g., DPE array 202, PL 204, PS 206, and NoC 208). PMC 210 operates as a dedicated platform manager that decouples PS 206 from PL 204. As such, PS 206 and PL 204 may be managed, configured, and/or powered on and/or off independently of one another.

Hardened circuit blocks 212 include special-purpose circuit blocks fabricated as part of IC 200. Though hardened, hardened circuit blocks 212 may be configured by loading configuration data into control registers to implement one or more different modes of operation. Examples of hardened circuit blocks 212 may include input/output (I/O) blocks, transceivers for sending and receiving signals to circuits and/or systems external to IC 200, memory controllers, or the like. Examples of different I/O blocks may include single-ended and pseudo differential I/Os. Examples of transceivers may include high-speed differentially clocked transceivers. Other examples of hardened circuit blocks 212 include, but are not limited to, cryptographic engines, digital-to-analog converters (DACs), analog-to-digital converters (ADCs), and the like. In general, hardwired circuit blocks 212 are application-specific circuit blocks.

CFI 214 is an interface through which configuration data, e.g., a configuration bitstream, may be provided to PL 204 to implement different user-specified circuits and/or circuitry therein. CFI 214 is coupled to and accessible by PMC 210 to provide configuration data to PL 204. In some cases, PMC 210 is capable of first configuring PS 206 such that PS 206, once configured by PMC 210, may provide configuration data to PL 204 via CFI 214.

The various programmable circuit resources illustrated in FIG. 2 may be programmed initially as part of a boot process for IC 200. During runtime, the programmable circuit resources may be reconfigured. In one aspect, PMC 210 is capable of initially configuring DPE array 202, PL 204, PS 206, and NoC 208. At any point during runtime, PMC 210 may reconfigure one or more or all or portions of DPE array 202, PL 204, PS 206, and NoC 208. In some cases, PS 206 may configure and/or reconfigure PL 204 and/or NoC 208 once initially configured by PMC 210.

Figure 3:
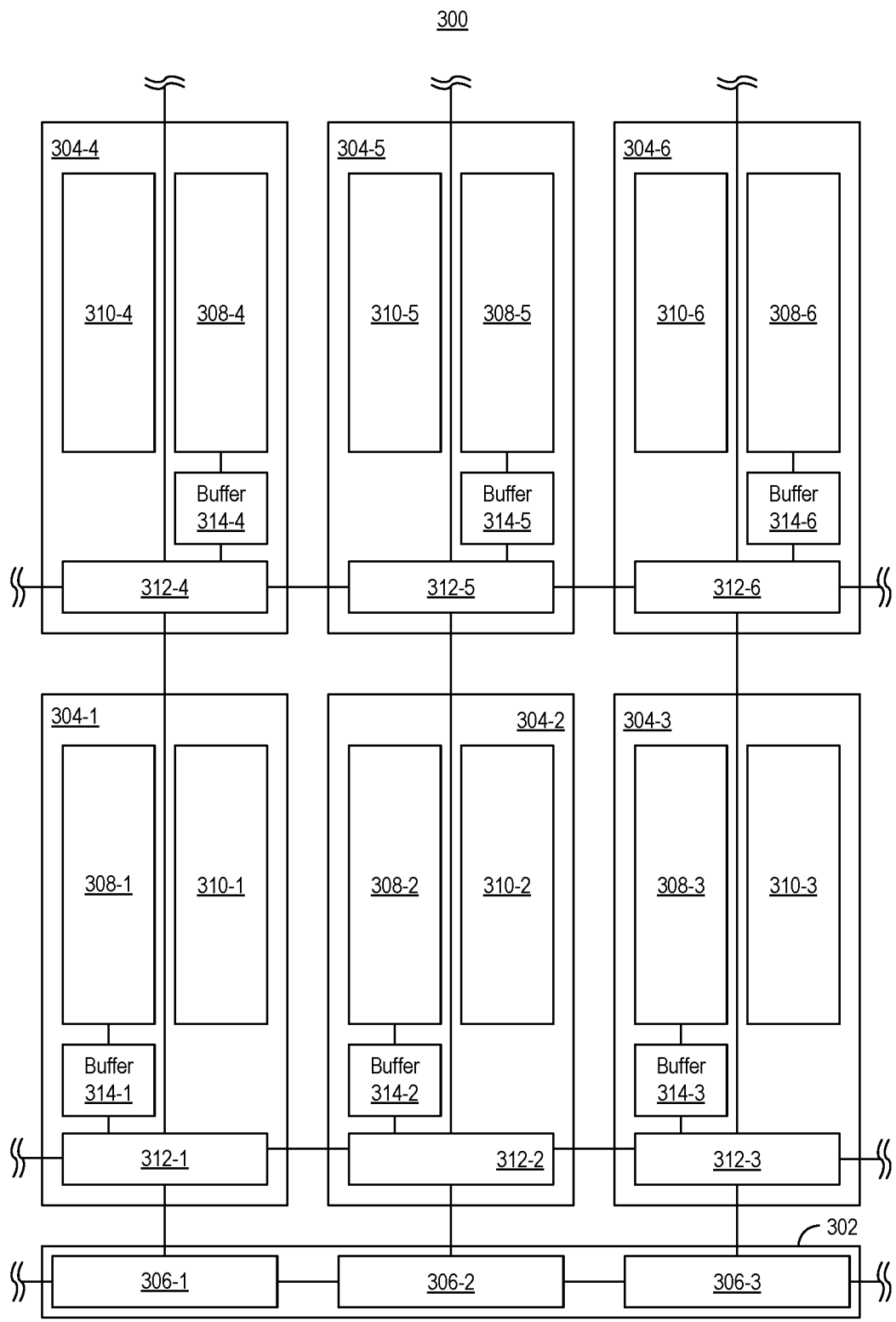
FIG. 3 illustrates an example of a DPE array that includes dedicated buffers.

FIG. 3 illustrates an example of a DPE array 300 that includes dedicated buffers. DPE array 300 may be implemented substantially similar to DPE array 202 of FIG. 2. In the example, DPE array 300 includes SoC interface 302 and DPEs 304. SoC interface 302 includes tiles 306. Each DPE 304 includes a core 308 and a memory module 310. Memory modules 310 may include a plurality of different banks (not shown) to which additional buffers may be allocated if needed. In the example of FIG. 3, each DPE 304 further includes a dedicated buffer 314. Each buffer 314 may be implemented as a memory circuit that is configured to operate as a FIFO memory referred to herein as a "buffer." Each buffer 314 may be coupled to the core 308 within the same DPE 304. Each DPE 304 includes interconnect circuitry 312. Interconnect circuitry 312, for example, may include a memory mapped switch and a stream switch. As pictured buffers 314 may be coupled to interconnect circuitry 312. At runtime, e.g., once DPE array 300 is configured, the connections (e.g., data paths) between kernels functioning as drivers and loads and connecting buffers correspond to stream interconnects established by the respective stream switches of interconnect circuitry 312.

The kernels of an application such as application 120 may be mapped to particular cores 308 of DPE array 300. Further, buffers 314 must be allocated to particular data paths or nets of the application 120 that connect different sources and loads, e.g., kernels, as mapped to particular cores 308 and DPEs 304.

Figure 4:
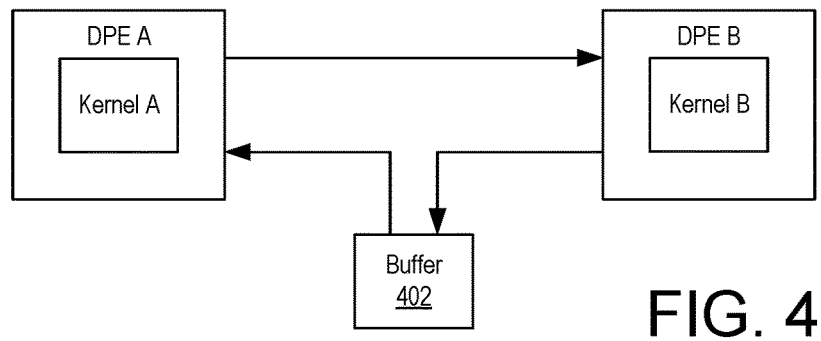
FIG. 4 illustrates an example of an application for a DPE array where buffering is added to remove a deadlock condition.
Figure 5:
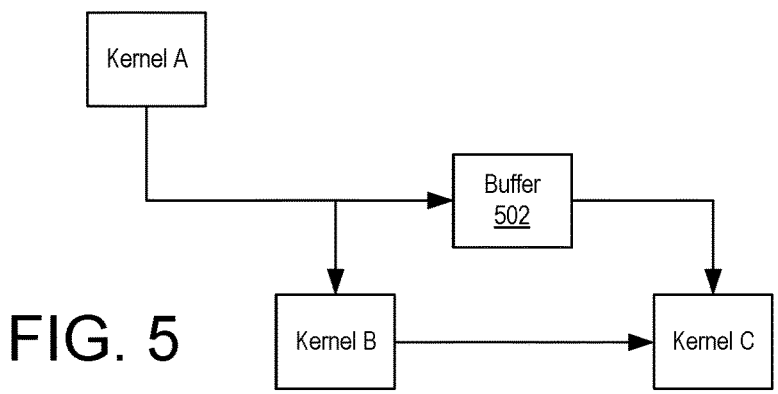
FIG. 5 illustrates an example of an application for a DPE array where buffering is added to prevent packets from arriving too early at load kernels.
Figure 6:
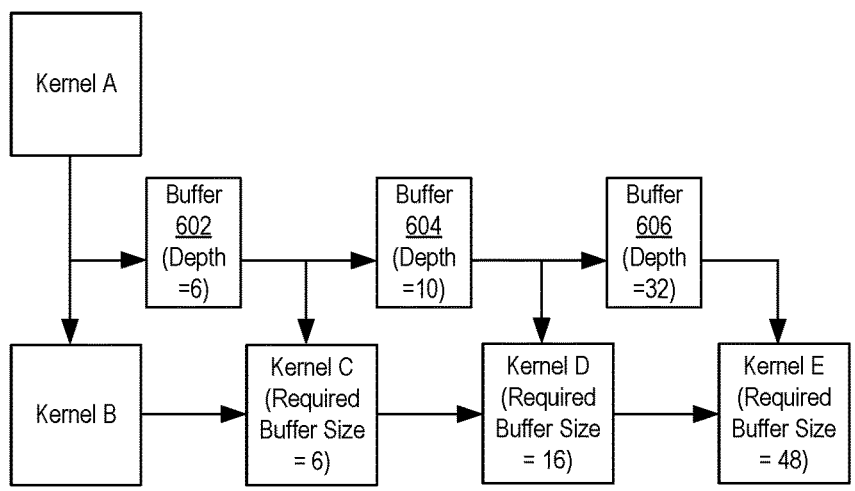
FIG. 6 illustrates an example of an application for a DPE array where the DPE compiler inserts additional buffers to improve data throughput of the implemented application.

FIGS. 4-6 illustrate various cases where an allocation of buffers for an application resolves various implementation issues. FIG. 4 illustrates an example of an application for a DPE array where DPE compiler 102 adds buffering to remove a deadlock condition. The example of FIG. 4 includes kernels A and B mapped to DPEs A and B, respectively. DPEs A and B may be adjacent to one another. Buffers, e.g., FIFO type buffers, may be added to store and transmit packets in the order of arrival. In the example of FIG. 4, kernel A produces packets at a rate of one per clock cycle while kernel B consumes those packets and produces new packets at the same rate for kernel A to consume. Until kernel A has produced the final packet, kernel A cannot consume any further packets from kernel B. If there is insufficient buffering in the path from kernel B to kernel A, then deadlock will occur. Buffer 402 alleviates the deadlock thereby increasing runtime efficiency of the application as implemented in a DPE array.

FIG. 5 illustrates an example of an application for a DPE array where DPE compiler 102 adds buffering to prevent packets from arriving too early at load kernels. In cases where data arrives too early at the destination, the throughput of the resulting application as implemented in a DPE array may be reduced. In the example of FIG. 5, kernel A produces packets that are provided to both kernel B and kernel C. Kernel C, however, has an added necessary input from kernel B. Since kernel B only produces packets after receiving packets from kernel A, were packets from kernel A to arrive at both kernels B and C at the same time, backpressure would result that stalls the output of kernel A while kernel C waits for packets from kernel B. In the example of FIG. 5, buffer 502 is inserted to accommodate for the latency of packet generation from kernel B.

FIG. 6 illustrates an example of an application for a DPE array where DPE compiler 102 adds buffering to improve data throughput of the application as implemented in a DPE array. In the example of FIG. 6, based on the application and dependencies therein between kernels and data flows (e.g., nodes and edges), the DPE compiler 102 is capable of determining a minimum number of buffers needed to implement the application in the DPE array based on the DFG. The DPE compiler 102 may also determine locations, e.g., optimal locations, for such buffers. In the example of FIG. 6, the depths described in connection with buffers refer to the number of packets that may be stored by the respective buffers. Further, within this disclosure, unless otherwise specified, the term "buffer" refers to a FIFO memory.

In determining required buffers and buffer locations, the DPE compiler 102 is also capable of determining which buffers may be shared among different loads. For example, such information may be specified in the DFG specifying the application. Due buffer scarcity, some loads that require buffers may be able to share buffers. In the example of FIG. 6, the application includes kernels A, B, C, D, and E. Kernel B requires output from kernel A. Kernel C requires output from kernels A and B. Kernel D requires output from kernels A and C. Kernel E requires output from kernels A and D.

In the example, the required depth of the various buffers is shown for each respective buffer. The depths shown for each buffer are the depths necessary to prevent stalling. DPE compiler 102 may determine the necessary depths for the buffers based on the application and known execution times for the kernels. In the example of FIG. 6, each kernel does not require a unique or dedicated buffer. Rather, the buffers may be shared. For example, kernels C, D, and E each may share buffer 602. Buffer 602 provides the needed depth of 6 to kernel C. Buffer 602, for example, has a depth that accounts for the processing time required by kernel B. Kernel D has a required buffer size of 16 that is met from the depth of 6 provided by buffer 602 and the depth of 10 provided by buffer 604. Buffer 604, for example, has a depth that accounts for the processing time required by kernel C. Kernel E has a required buffer size of 48 that is met from the depth of 6 provided by buffer 602, the depth of 10 provided by buffer 604, and the depth of 32 provided by buffer 606. Buffer 606, for example, has a depth that accounts for the processing time required by kernel D. The example implementation of FIG. 6 can save on scarce buffer resources while still maintaining throughput of the application as implemented in the DPE array.

As may be seen in the examples of FIGS. 2-3, dedicated buffers within the DPE array are available only at discrete locations. As discussed, conventional routing techniques that seek to minimize distance are unable to discover paths that include the buffering necessary for efficient implementation of an application in a DPE array, e.g., an implementation that addresses the issues described in connection with FIGS. 4-6. The inventive arrangements described herein provide a solution that is global in scope and that is also capable of sharing buffers among loads of nets as illustrated in the example of FIG. 6.

In the examples described in connection with FIGS. 4-6, buffers may have a predetermined or known size. Accordingly, DPE compiler 102 may determine the number of buffers needed for a given net based on the kernels execution times, the edges connecting the kernels forming a data path, the known size of the buffers, and the availability and location of buffers in the DPE architecture.

FIG. 7A illustrates an example method 700 of implementing an application for a DPE array. Method 700 illustrates an example method 700 that may be performed as part of a compilation process for the application. Method 700 may be performed by the EDA system described in connection with FIG. 1 to implement application 120 within a DPE array as described in connection with FIGS. 2-6.

In block 702, the EDA system 100 is capable of generating, from application 120, a compact DFG 130. In general, the compact DFG 130 includes a plurality of nodes representing buffers, drivers, and loads of application 120. The compact DFG 130 may include nodes that represent only buffers, drivers, and loads of application 120. Other circuit structures, for example, may not be represented and may be omitted. In one aspect, the plurality of nodes include virtual buffer nodes that map to buffers of the DPE array and load nodes that map to the loads. Within compact DFG 130, each driver node and load node may represent a kernel as mapped to a particular DPE and core of the DPE.

Figure 8:
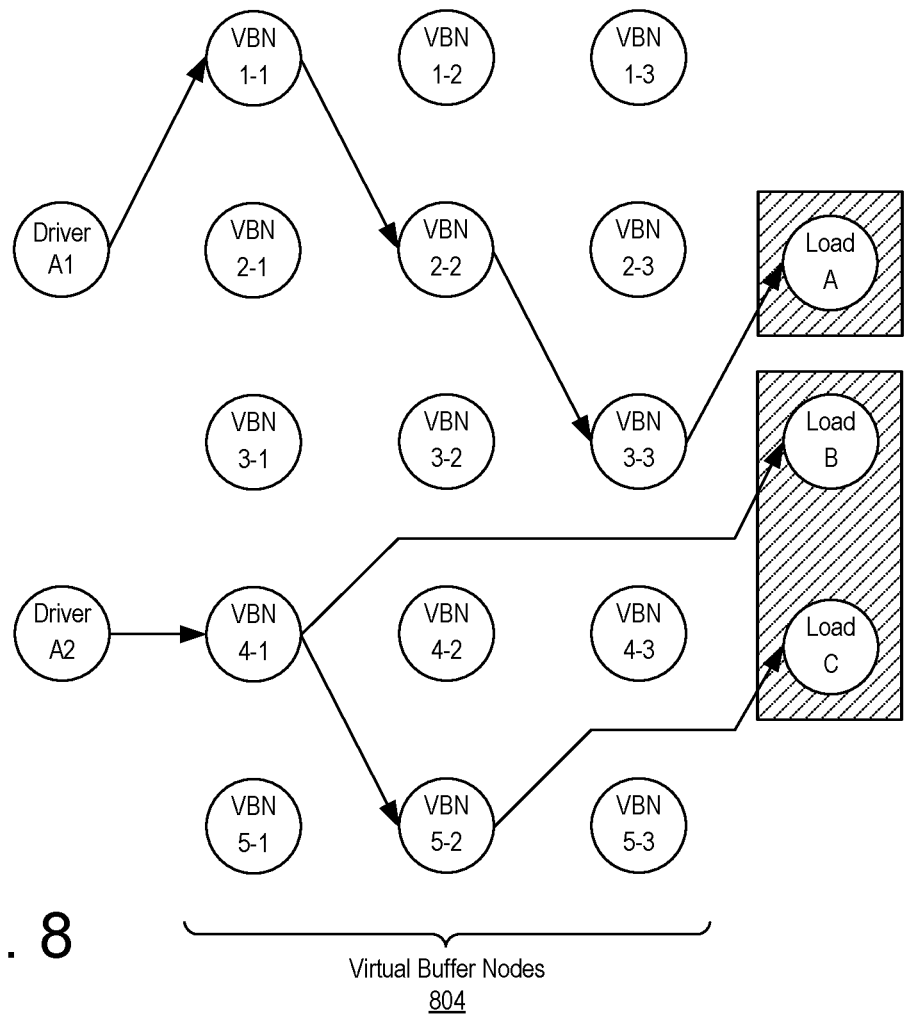
FIG. 8 illustrates an example of a compact data flow graph (DFG) specifying a buffer allocation for an application.

FIG. 8 illustrates an example of compact DFG 130 generated by compact DFG generator 108. In the example of FIG. 8, the compact DFG 130 includes virtual driver nodes A1 and A2, a plurality of virtual buffer nodes 804 (e.g., shown as VBNs), and load nodes A, B, and C. Thus, compact DFG 130 specifies drivers, loads, and buffers for nets of application 120.

In the example of FIG. 8, the driver nodes are virtual driver nodes in that multiple virtual driver nodes may map onto a single driver of the application to be mapped onto the DPE array. In the example of FIG. 8, virtual driver nodes A1 and A2 map onto, or represent, a single driver (e.g., a single kernel). The load nodes A, B, and C each represents a load of the application that is mapped to the DPE array. Load nodes of compact DFG 130 correspond to loads of the application on a one-to-one basis.

Virtual buffer nodes 804 only exist in the compact DFG 130 and map onto a single physical buffer. Each physical buffer may be represented by one or more virtual buffer nodes. In the example of FIG. 8, each row of virtual buffer nodes corresponds to one buffer of the DPE array. That is, each of VBN 1-1, VBN 1-2, and VBN 1-3 maps onto or represents a single physical buffer. Similarly, each of VBN 2-1, VBN 2-2, and VBN 2-3 maps onto or represents a single physical buffer. Thus, compact DFG 130 of FIG. 8 represents 5 physical buffers, where each row of virtual buffer nodes 804 represents a different buffer.

Nodes may be connected by edges that represent data paths through the compact DFG 130. In one aspect, edges may be connected and subsequently pruned back to generate a finished compact DFG from which buffer allocation may be performed. At least initially, the compact DFG 130 may not include a plurality of virtual drivers as illustrated in the example of FIG. 8.

Between driver nodes and load nodes of the compact DFG, virtual buffer nodes 804 are inserted. Based on the application 120, each net will have a set number of buffers that the net is allowed to use. This number may be specified in the application and/or determined by the DPE compiler 102 from the application. The number of buffers a net is permitted to use may be specified on a per load basis. This number of buffers for each net may be determined prior to constructing the compact DFG 130.

Further, individual loads of the nets will have buffer amounts (e.g., depths) that will need to be met through allocation of buffers. The virtual buffer nodes 804 included in the compact DFG 130 make up one or more columns and rows between the driver nodes and the load nodes. Within this disclosure, the term column and layer may be used interchangeably to refer to columns of virtual buffer nodes. Each layer represents an ordering on the usage of the buffers of the DPE array. In the example shown in FIG. 8, the physical layout of a net's routing is dependent on the order that the virtual buffer nodes are traversed in the compact DFG 130. As illustrated in the example of FIG. 8 and previously described, a buffer can be represented across multiple layers (e.g., where VBN 1-1, VBN 1-2, and VBN 1-3 each maps onto or represents a single physical buffer 1).

In one aspect, the number of layers of virtual buffers 804 of compact DFG 130 is determined by a maximum number of physical buffers required by any load. Because the compact DFG 130 only progresses in one direction from the drivers to the loads, the number of layers of virtual buffer nodes 804 is set equal to the largest buffer requirement of any load of the application. For example, if the largest buffer requirement of any load was 5, the number of layers of virtual buffer nodes 804 included in compact DFG 130 is 5. In the example of FIG. 8, the largest buffer requirement of any load is 3. This requirement for the number of layers of virtual buffer nodes 804 allows a net to traverse from a virtual driver node to a load node and pass through up to the maximum number of buffers.

The number of rows, or the height, of virtual buffer nodes 804 in the compact DFG 130 is determined based on the total number of buffers seen by all nets (e.g., loads) of the application. For example, if load A can see 3 unique or different buffers, load B can see 1 unique buffer, and load C can see 1 unique buffer, the number of rows of virtual buffer nodes 804 in compact DFG 130 will be 5 (e.g., 3+1+1). The number of buffers "seen" by a net means the number of buffers that the net is allowed to use in the DPE array given any applicable constraints specified by the developer of the application or imposed (e.g., internally generated) by the compiler. Generally, constraints may be specified as geometric restrictions applied to the regions of the IC that the net is permitted to use. The largest buffer requirement may be determined as the largest number of buffers required by any load of the design. The compact DFG operates on virtual buffers of distinct amounts that correspond to the discrete buffer amounts found in the DPE array.

Figure 9:
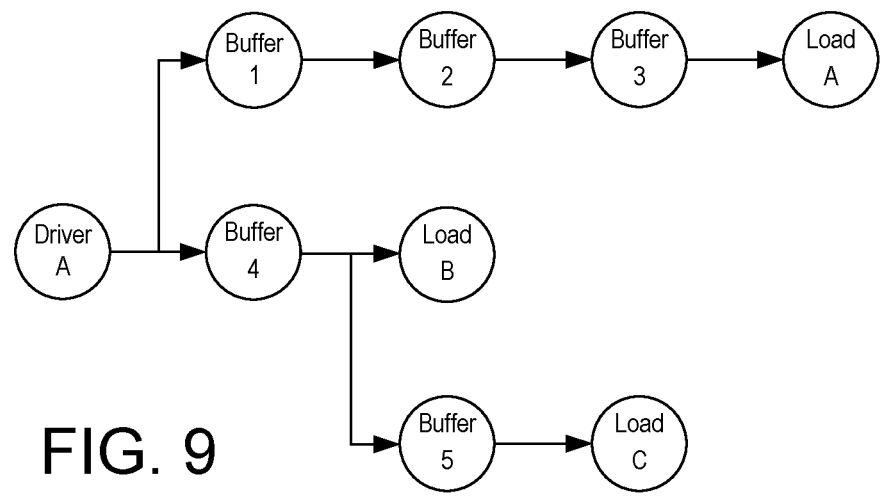
FIG. 9 illustrates a physical representation of the buffer allocation illustrated in the example of FIG. 8.

FIG. 9 illustrates a physical representation of the buffer allocation illustrated in the example of FIG. 8. As shown, load A does not share any buffers with load B or load C. Load B shares the buffer 4 corresponding to VBN 4-1 with load C.

In another aspect, each edge will have a distance associated therewith. For purposes of illustration, distances are not shown in the example of FIG. 8. The distances annotated on the edges may be used to select buffer allocations that minimize the distance traveled, where distance may be used in combination with other constraints and/or cost functions that promote detours to allocate buffers.

Figure 10:
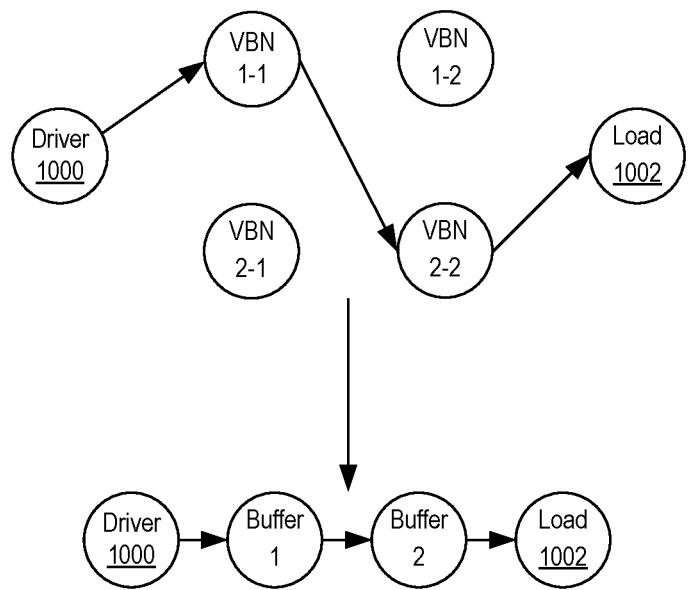
FIGS. 10 and 11 illustrate examples of compact DFGs corresponding to different buffer allocations.
Figure 11:
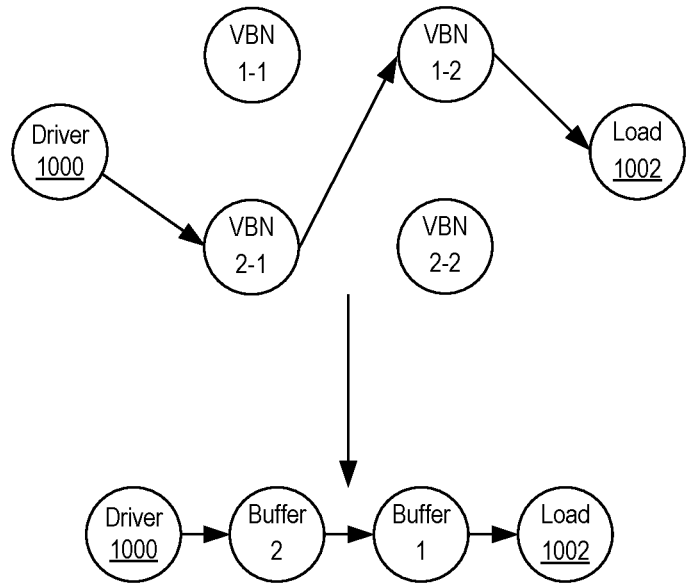

FIGS. 10 and 11 illustrate further examples of compact DFGs that may be generated by DPE compiler 102. In the examples of FIGS. 10 and 11, the driver 1000 and load 1002 have a buffer requirement of 2. Each physical buffer is represented by 2 virtual buffer nodes in the compact DFG. For example, buffer 1 is represented by VBN 1-1 and VBN 1-2. Buffer 2 is represented by VBN 2-1 and VBN 2-2. FIGS. 10 and 11 illustrate how the compact DFGs may be connected to specify a particular ordering of buffers in the nets. FIG. 10, for example, shows that the net traverses from driver 1000, to buffer 1, to buffer 2, to load 1002. The example of FIG. 11 illustrates the case where the net traverses from driver 1000, to buffer 2, to buffer 1, to load 1002.

In block 704, the EDA system 100 is capable of, for each net of a plurality of nets of application 120, forming groups of load nodes based on shared buffer requirements of the loads and adding a virtual driver node to the compact DFG for each group. Each virtual driver node maps to a driver of the application.

For each virtual driver node, the set of corresponding load nodes will be those load nodes of a single net that can legally share buffers. This means that the same driver may be represented multiple times in the compact DFG as a plurality of virtual driver nodes since each net may be split into multiple subnets based on the buffer sharing ability of the loads of the net. The compact DFG generator 108 is capable of grouping loads of the same net into groups that can share some or all their buffer requirement.

Those load nodes that can share buffer requirements are provided with a unique virtual driver. That is, the compact DFG generator 108 is capable of inserting a virtual buffer node into the compact DFG for each group of loads. To differentiate between nets and the subnets (groups) formed, the net that contains all loads is simply referred to as the "net." The portion of a net that includes a group of one or more (e.g., a subset) of the loads of the net is referred to as a subnet. A net may be formed of two or more subnets. Referring to FIG. 8, for example, the net includes loads A, B, and C. The new subnets in the compact DFG corresponding to load groups capable of sharing loads are called subnets of the main net. The included virtual driver nodes map to the driver for the net. Because there may be multiple groups of loads for a net, there may be multiple virtual driver nodes that map to the same driver.

Referring again to FIG. 8, it can be seen that load A does not share any buffer requirements with loads B or C. Load B and C, however, do share buffer requirements. Accordingly, compact DFG generator 108 generates two groups for the net with loads A, B, and C. A first group includes load A and corresponds to a first subnet having load A. A second group includes loads B and C and corresponds to a second subnet including loads B and C. One virtual driver node is inserted for each group of loads or subnet. In the example of FIG. 8, virtual driver nodes A1 and A2, each corresponding to the same physical driver of the application, are inserted. Virtual driver node A1 drives the first subnet including load A. Virtual driver node A2 drives the second subnet including loads B and C. Whether two or more loads of a net may share buffer(s) may depend on application-specific requirements and is generally determined by the developer and may be specified in the DFG and/or compact DFG.

Figure 12:
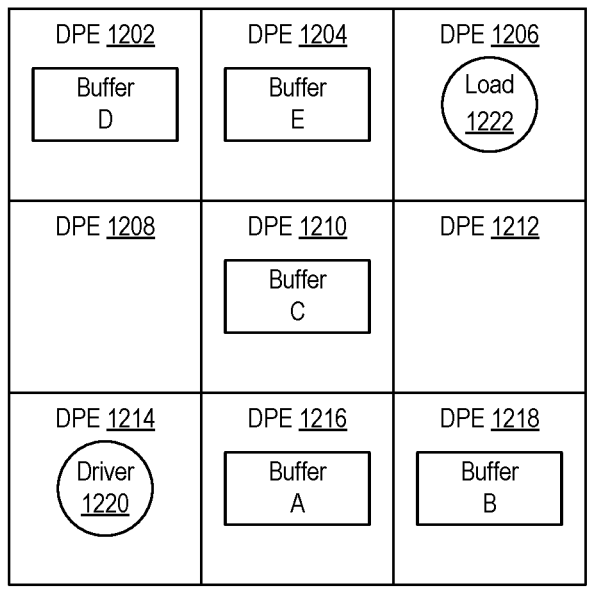
FIG. 12 illustrates an example DPE array showing a driver, a load, and a plurality of buffers.
Figure 13:
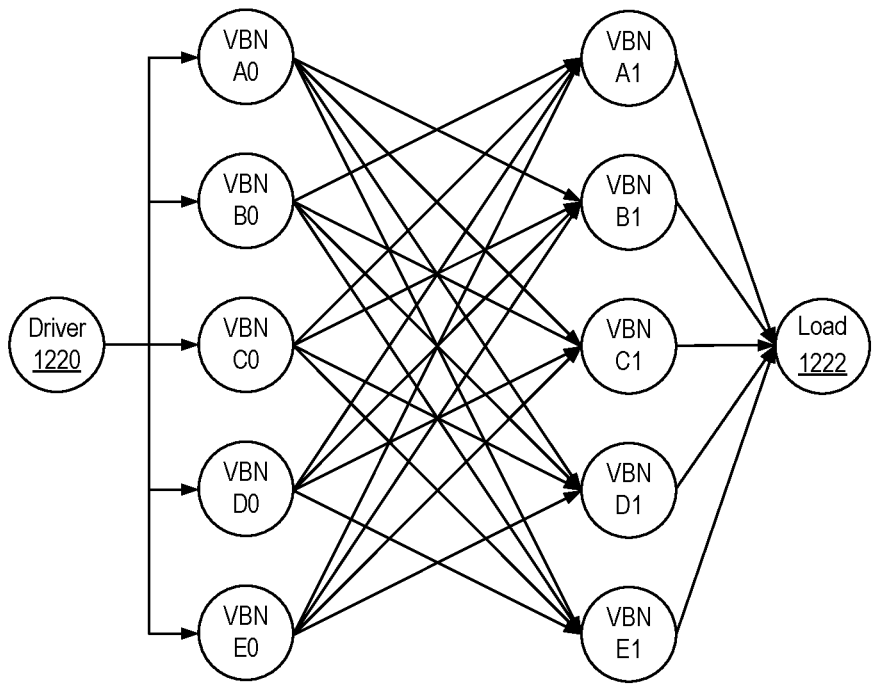
FIG. 13 illustrates an example of a fully connected compact DFG corresponding to the example of FIG. 12.

In block 706, the EDA system 100 is capable of creating connections between the virtual driver nodes and the load nodes through the virtual buffer nodes to fully connect the compact DFG. Referring to the example of FIG. 12, an illustrative DPE array having DPEs 1202, 1204, 1206, 1208, 1210, 1212, 1214, 1216, and 1218 is shown. For purposes of illustration, buffers A, B, C, D, and E exist in the various DPEs as shown. Driver 1220 is mapped to DPE 1214. Load 1222 is mapped to DPE 1206. FIG. 13 illustrates an example of a fully connected compact DFG corresponding to the example of FIG. 12. Each of the buffers A, B, C, D, and E is illustrated as two virtual buffer nodes 0, 1. Referring to FIG. 13, the term "fully connected" means that each of the virtual buffer nodes of a layer is connected to each virtual buffer node corresponding to a different physical buffer in the next layer. A virtual buffer node in one column that corresponds to a particular physical buffer may not be connected to a virtual buffer node of an adjacent layer for the same buffer. For example, since virtual buffer nodes A0 and A1 correspond to the same physical buffer, virtual buffer node A0 is connected to each of virtual buffer nodes B1, C1, D1, and E1, but not to virtual buffer node A1. Similarly, virtual buffer node B0 is connected to each of virtual buffer nodes A1, C1, D1, and E1, but not to virtual buffer node B1.

In one or more example implementations, connections of the fully connected compact DFG may be pruned. For example, prior to allocation of the buffers, one or more connections between the virtual driver nodes and the load nodes may be pruned, e.g., removed, based on constraints defining which virtual buffer nodes are available to each net of the plurality of nets. As illustrated, at least initially, the compact DFG includes all buffers being connected to all nets. Each layer of virtual buffer nodes is fully connected as described herein.

For a variety of reasons, however, the set of buffers that are available to each net may be less than all based on any applicable constraints. As such, the connections may be reduced in kind. The set of buffers represented in the compact DFG may include all physical buffers of the DPE array or a subset of such buffers depending on internal or external constraints. An example of an internal constraint may be EDA system 100 applying a boundary (e.g., a geometric boundary applied to the physical DPE array) where only those buffers within the boundary are considered for buffer allocation to decrease runtime or increase compactness of the application implementation in the DPE array. An example of an external constraint may be a similar type of boundary that is user-specified. Each load of the net may use any of the subset of buffers to satisfy the amount of buffer depth required.

Because each net has only a subset of buffers that may be used, edge connections from the virtual driver nodes to the first layer of virtual buffer nodes may be limited. Each virtual driver node will only have an edge connecting to the particular buffers, as represented by virtual buffer nodes, that the net is permitted to use. Each virtual buffer node in a selected layer will have an edge connection to a virtual buffer node of the next layer only if at least one subnet taking the current virtual buffer node can take another virtual buffer node (e.g., take another buffer). In other words, if two or more subnets are incident on a selected virtual buffer node, then that the selected virtual buffer node will have an outgoing connection to each virtual buffer node in the next layer that is in the subset of virtual buffer nodes formed of all incident subnets on the selected virtual buffer node.

It should be appreciated, however, that when solving for buffer allocation, a net may only take a virtual buffer node that exists within a subnet of the net. All loads will have edges from the layer that corresponds to the buffer requirement for the load. That is, if a load node has a buffer requirement of 2 (e.g., two buffers are required), the load node is connected to a virtual buffer node in the second layer and is not connected to any other virtual buffer nodes in layers beyond the second. Thus, the second column of virtual buffer nodes will have an edge or edges to the load.

The edge(s) to the load may only exist from virtual buffer nodes that exist in the subset of reachable virtual buffer nodes for that specific subnet.

In block 708, the EDA system is capable of using the compact DFG to generate a buffer allocation for the application. In one example implementation, the buffer allocation may be determined by generating an ILP formulation and solving the ILP formulation. The buffer allocation engine 110 may be implemented as an ILP engine capable of generating and solving an ILP formulation as described herein. An example implementation of block 708 using an ILP formulation is described in connection with FIG. 7B. Solving the ILP formulation results in a buffer allocation that specifies one or more topological constraints. Subsequently, the topological constraints may be used by a conventional router (e.g., one that minimizes route length) in routing the nets. The topological constraints enforce a structure on the router and so that the router generates a routing solution in which the net(s) are routed through the buffers specified by the buffer allocation found by ILP.

In another aspect, the buffer allocation may be determined using a router that is adapted to understand and traverse the compact DFG. An example implementation of block 708 using a router adapted for use with a compact DFG is described in connection with FIG. 7C. In that case, the router is capable of determining a buffer allocation by generating one or more topological constraints. The topological constraints may be used later by a conventional router (e.g., one that minimizes route length) in routing the nets. The topological constraints enforce a structure on the router and so that the router generates a routing solution in which the net(s) are routed through the buffers specified by the buffer allocation.

FIG. 7B illustrates an example implementation of block 708 using ILP. That is, an ILP engine may be used to implement buffer allocation engine 110. Referring the use of ILP, in block 710, the EDA system is capable of generating an ILP formulation including a plurality of equations and one or more cost functions for allocating buffers to nets of the application based on the compact DFG as currently connected. The EDA system 100 generates the ILP formulation with the objective of satisfying all buffer requirements of the application while also minimizing buffer usage. Using an ILP formulation allows the EDA system 100 to approach the buffer allocation problem from a global perspective in that buffers are allocated across all of the nets of the application concurrently as the nets compete for buffers.

In the example of FIG. 7B, buffer allocation engine 110 may be implemented as an ILP engine that is capable of generating the ILP formulation as a system of equations that model the buffer requirements for each load of the application. The buffer allocation engine 110 further is capable of solving the system of equations, e.g., the ILP formulation, to produce a solution specifying an allocation of buffers to the nets of the application.

Figure 14:
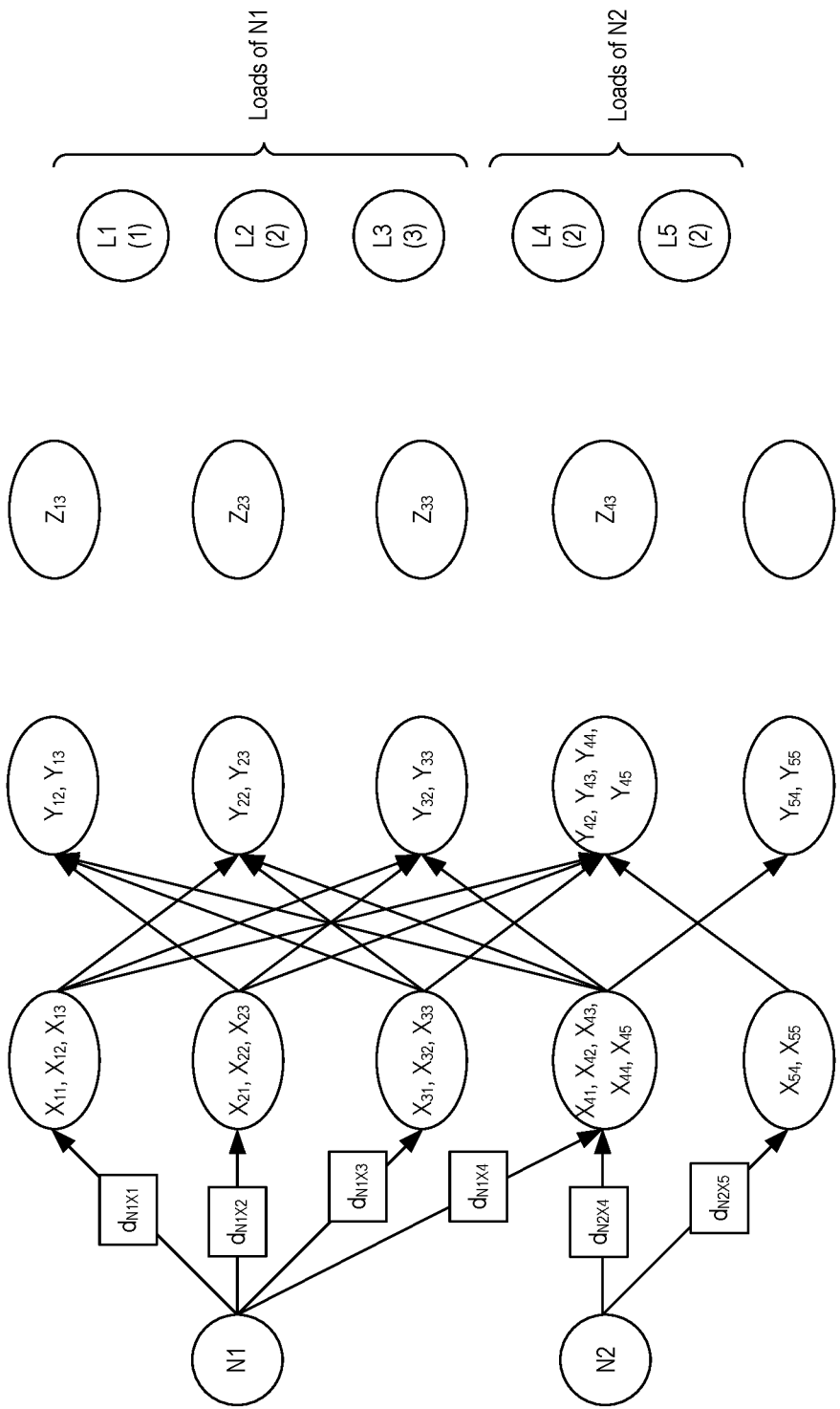
FIG. 14 illustrates another example of a compact DFG from which an EDA system may generate an Integer Linear Programming (ILP) formulation.

FIG. 14 illustrates another example of a compact DFG from which EDA system 100 may generate an ILP formulation. In the example of FIG. 14, additional labels are added to facilitate discussion of the ILP formulation and solving of the ILP formulation. The following describes the nomenclature used in creating the variables of the ILP formulation and the various equations that are generated.

In the example of FIG. 14, the virtual driver nodes are illustrated as N1 and N2 referring to subnet 1 and subnet 2 of a net. As discussed, each edge of a compact DFG may have an associated distance or distance cost. For purposes of illustration, only those edges connecting virtual driver nodes N1 and N2 to the virtual buffer nodes of the first layer are shown with distances, or distance costs, annotated thereon. The terms "distance" and "distance cost" are used interchangeably within this disclosure.

The loads of the net illustrated in FIG. 14 are indicated as load nodes L1, L2, L3, L4, and L5. Within each load node, the number in parenthesis specifies the buffer requirement of the load. That is, the load represented by load node L1 requires 1 buffer, while the load represented by load node L2 requires 2 buffers. Further, in the example, it can be seen that loads represented by load nodes L1, L2, and L3 are in a first group corresponding to the first subnet driven by virtual driver N1. The loads represented by load nodes L4 and L5 are in a second group corresponding to the second first subnet driven by virtual driver N2.

Referring to the edge connecting virtual driver node N1 and virtual buffer node $[X_{11}, X_{12}, X_{13}]$, the distance cost is specified as $d_{N1x1}$. In the distance cost $d_{N1X1}$, "$N_i$" specifies the subnet index and "$X_j$" specifies the buffer index (e.g., the particular buffer of the DPE array to which the virtual buffer node refers). For example, the distance cost $d_{N1X2}$ refers to the distance between virtual driver node N1 (e.g., the virtual driver for subnet 1) to the physical buffer having an index of 2.

The virtual buffer nodes are named using a first letter that indicates the layer position of the virtual buffer node. In the example of FIG. 14, the layers of virtual buffer nodes are ordered and labeled X, Y, and Z from left to right. The subscript numbers following the letters refer to the physical buffer index and the load index. For the first layer of virtual buffer nodes, the virtual buffer node labeling takes the form of "$X_{ij}$," where the "i" specifies the buffer index represented by the virtual buffer node and the "j" specifies the load index. For example, the label $Y_{12}$ specifies the virtual buffer that appears in the 2nd layer and that maps to the buffer having an index of 1 and a load having a load index of 2. In this regard, the virtual buffer node having the full label "$X_{11}$, $X_{12}$, $X_{13}$" may be uniquely referred to using any of the individual labels of "$X_{11}$" or "$X_{12}$" or "$X_{13}$".

The following describes example variables and equations created by buffer allocation engine 110 based on the compact DFG as connected in creating the ILP formulation.

In determining a solution for the ILP formulation, the buffer requirement for each load node needs to be met. This can be expressed as an equation where the total amount of buffers taken for each load should add up to the buffer requirement for the load. For example, referring to load node L1, the buffer requirement is 1. Since buffers are allocated from left to right (driver to load), this means that the buffer requirement for load node L1 must be met by assignment of a virtual buffer node from the first layer of virtual buffer nodes (e.g., an "X" labeled virtual buffer node). Due to the constraints and the formation of the compact DFG, the buffer allocation engine 110 determines that load node L1 may only take physical buffers represented by virtual buffer nodes $X_{11}$, $X_{21}$, $X_{31}$, and $X_{41}$. With virtual buffer nodes $X_{11}$, $X_{21}$, $X_{31}$, and $X_{41}$ being binary variables, the buffer allocation engine 110 is capable of generating an equation for load node L1 such as Expression 1.

$$X_{11}+X_{21}+X_{31}+X_{41}=1 \tag{1}$$

For load node L2, the buffer allocation engine 110 is capable of generating an equation such as Expression 2.

$$X_{12}+X_{22}+X_{32}+X_{42}+Y_{12}+Y_{22}+Y_{32}+Y_{42}=2 \tag{2}$$

Buffer allocation engine 110 is capable of generating such an equation for each of the load nodes L1, L2, L3, L4, and L5.

In addition to meeting the buffer requirement for each load, each load may only use one buffer from each layer of virtual buffer nodes. For example, for load node L2, the buffer allocation engine 110 is capable of generating equations illustrated as Expressions 3 and 4. Expression 3 models usage of only one buffer from the first layer, while Expression 4 models usage of only one buffer from the second layer.

$$X_{12}+X_{22}+X_{32}+X_{42}=1 \tag{3}$$

$$Y_{12}+Y_{22}+Y_{32}+Y_{42}=1 \tag{4}$$

Buffer allocation engine 110 is capable of generating such equations for each of the load nodes L1, L2, L3, L4, and L5.

To enable sharing of virtual buffer nodes among the loads of a given subnet, the buffer allocation engine 110 is capable of adding an additional variable that models whether a virtual buffer node is assigned to a given subnet. These variables take the format of $SL_{ij}$, where the L refers to the layer letter (X, Y, Z, etc.), the "i" refers to the index of the buffer represented by the virtual buffer node, and the "j" refers to the subnet index. The buffer allocation engine 110 is capable of generating a variable for each virtual buffer node where the variable is equal to 1 if one or more loads of a subnet take (e.g., use) the virtual buffer node and zero otherwise.

For example, buffer allocation engine 110 is capable of generating variables illustrated below in Expressions 5, 6, and 7. Expression 5 evaluates to 0 if no loads of subnet 1 take the physical buffer having an index of 1. Expression 5 evaluates to 1 if one or more loads of subnet 1 take the physical buffer having an index of 1. Expression 6 evaluates to 0 if no loads of subnet 1 take the physical buffer having an index of 4. Expression 6 evaluates to 1 if one or more loads of subnet 1 take the physical buffer having an index of 4. Expression 7 evaluates to 0 if no loads of subnet 2 take the physical buffer having an index of 4. Expression 7 evaluates to 1 if one or more loads of subnet 2 take the physical buffer having an index of 4. In the examples of Expressions 5, 6, and 7, the symbol ∥ denotes a logical OR operation.

$$SX_{11}=X_{11}\|X_{12}\|X_{13} \tag{5}$$

$$SX_{41}=X_{41}\|X_{42}\|X_{43} \tag{6}$$

$$SX_{42}=X_{44}\|X_{45} \tag{7}$$

Buffer allocation engine 110 is capable of generating a variable as illustrated in the examples of Expressions 5, 6, and 7 for each virtual buffer node.

To ensure that each physical buffer can only be taken once, buffer allocation engine 110 is capable of generating equations such as illustrated in Expressions 8 and 9. Expressions 8 and 9 ensure that all virtual buffer nodes referring to the same buffer do not have a combined usage greater than 1. Expression 8, for example, ensures that the buffer having an index of 1 is not used more than one time. That is, the subnet 1 cannot take more than one virtual buffer node corresponding to the physical buffer having an index of 1. Expression 9 ensures that the physical buffer having an index of 4 is not used more than one time. That is, either subnet 1 or subnet 2 holds the physical buffer and cannot take more than one virtual buffer node corresponding to the physical buffer having an index of 4.

$$SX_{11}+SY_{11}+SZ_{11}<=1 \qquad (8)$$

$$SX_{41}+SX_{42}+SY_{41}+SY_{42}+SZ_{41}<=1 \qquad (9)$$

Buffer allocation engine 110 is capable of generating an equation such illustrated in Expression 8 or 9 for each set of virtual buffer nodes representing a same physical buffer.

To facilitate minimization of detours in finding the needed buffers for each load, buffer allocation engine 110 is capable of generating an equation for each load that depends on the distance cost to reach that load from the driver. Expression 10, for example, specifies the distance cost to load L1. In the Expression 10, the distance costs include the distance cost from virtual driver node N1 to each potential virtual buffer node available to subnet 1 in the first layer and the distance cost from that virtual buffer node to load node L1. Appreciably, each distance is multiplied by the binary variable for the virtual buffer node where all but one of such binary variables will be set equal to 0.

$$CL1=(d_{N1X1}+d_{X1L1})*X_{11}+(d_{N1X2}+d_{X2L1})*X_{21}+(d_{N1X3}+d_{X3L1})*X_{31}+(d_{N1X4}+d_{X4L1})*X_{41} \qquad (10)$$

Buffer allocation engine 110 is capable of generating an equation such as illustrated in Expression 10 for each load node.

In order to determine the cost of a detour for using a particular buffer, e.g., allocating a particular buffer to a subnet, buffer allocation engine 110 is capable of creating equations for each load that model the detour cost as the difference between the distance cost for the load with buffer(s) allocated and the distance for the load without buffers allocated. The detour cost of load node L1, for example, may be modeled as Expression 11.

$$\text{detourCostL1}=CL1-(\text{distance from driver to load node}L1) \qquad (11)$$

In block 712, the buffer allocation engine 110 is capable of allocating physical buffers to the plurality of nets of the application by solving the ILP formulation described above to specify a buffer allocation for each of the plurality of nets based on one or more cost functions that minimize detour cost. For example, in solving the ILP formulation, the buffer allocation engine 110 is capable of meeting several different objectives. These include minimizing the maximum detour cost (e.g., the detour cost for a single subnet) and minimize the total detour cost across all subnets of the application (e.g., all main nets).

In one or more examples, the buffer allocation engine 110 is capable of accounting for one or more additional costs. In one aspect, buffer allocation engine 110 is capable of minimizing the total number of buffers used by adding up all of the buffer sharing variables. For example, the buffer allocation engine 110 is capable of using an equation such as that illustrated in Expression 12 with the objective of minimizing the quantity "Buffer Total."

$$\text{Buffer Total}=SX_{11}+SX_{21}+SX_{31}+SX_{41}+SX_{42}+\ldots+SZ_{41} \qquad (12)$$

In other examples, there may be cases where the buffer requirements of loads may change subsequent to solving the ILP formulation. In such cases, a minimal perturbation solution may be useful in generating a further ILP solution. Accordingly, in one aspect, the buffer allocation engine 110 may be configured to utilize, e.g., to re-use, as much of the prior buffer allocation solution as possible in generating the next ILP solution with the changed buffer requirements. This may be implemented by adding a cost to change the buffer allocation.

For example, if $X_{11}$ was taken in the ILP solution, for the next ILP formulation, an equation as illustrated in Expression 13 would be added.

$$\text{CostM}_{11}=1-M_{11} \qquad (13)$$

In Expression 13, $M_{11}=1$ if $X_{11}$ is taken in the subsequent ILP solution. The object with respect to Expression 13 would be to minimize the sum of the $M_{ij}$ variables expressed as $\min(\Sigma\ M_{ij})$.

In one or more examples, in cases where there is a desire to not only limit detours, but to decrease point-to-point distances, buffer allocation engine 110 may also add an objective function that may be used to minimize the distance between each virtual buffer node.

The example implementations described herein that utilize an ILP formulation provide a global approach to the buffer allocation problem where a solution for all nets of the application is determined together, e.g., concurrently. In applying the ILP technique described within this disclosure, higher numbers of layers of virtual buffer nodes within the compact DFG translate into longer runtimes of EDA system 100.

Accordingly, in one or more other example implementations, an iterative graph exploration technique may be used with the compact DFG. For example, in cases where the number of layers exceeds a selected threshold number of layers, the iterative graph exploration technique may be used in lieu of the ILP formulation described to perform block 708 of FIG. 7A. In general, the iterative graph-based technique implemented using a router adapted to interpret the compact DFG may provide reduced runtime for EDA system 100. While such a solution can result in decreased runtime, the graph-based technique does not operate with a global view of the buffer allocation problem to be solved as is the case with an ILP formulation.

Figure 15:
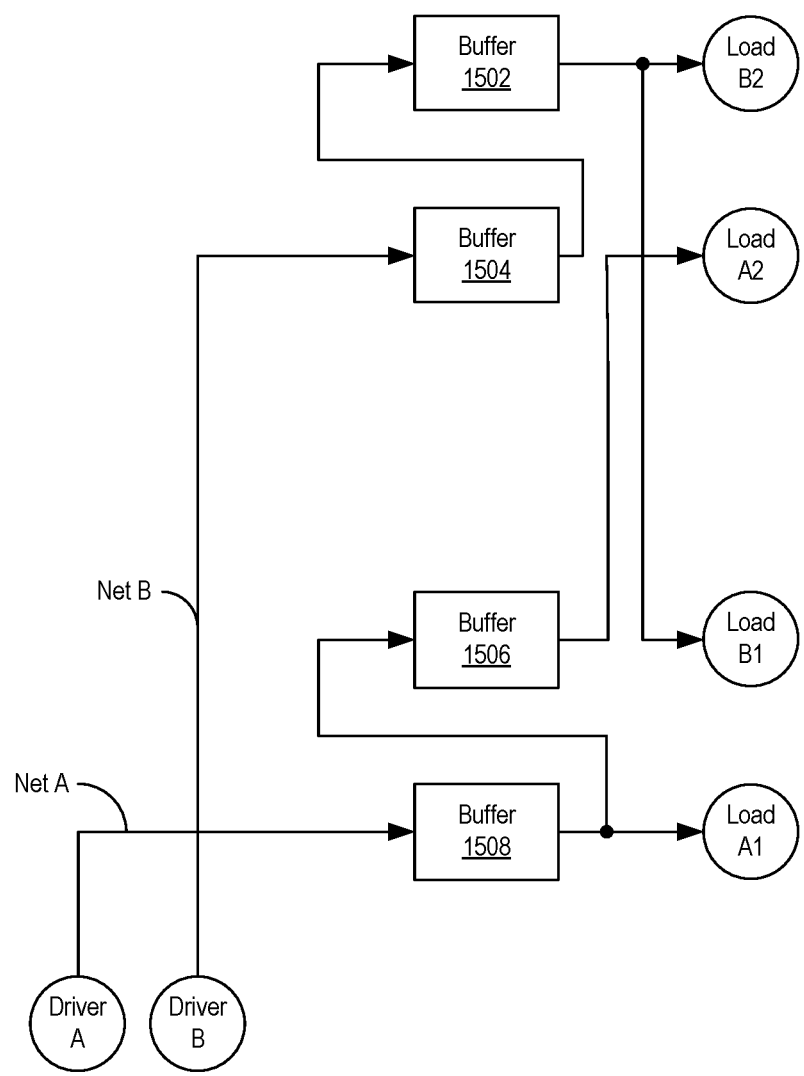
FIG. 15 illustrates an example buffer allocation generated by a conventional router configured to optimize for route length.

Conventional graph-based routers that seek to minimize distance of routes (e.g., length) often suffer from the disadvantage of optimizing the application on a per net basis. This local, per-net approach can lead to a buffer allocation similar to that illustrated in the example of FIG. 15 where the order in which the nets are processed for buffer allocation purposes can lead to a globally suboptimal solution. In the example of FIG. 15, buffers 1502, 1504, 1506, and 1508 are split into pairs where each pair of buffers, e.g., (1502, 1504) and (1506, 1508) is physically close to one load of each net. For example, buffer pair 1502, 1504 is closer to load A2, B2 than the other buffer pair, while buffer pair 1506, 1508 is physical closer to loads A1, B1 than the other buffer pair.

In the example of FIG. 15, the first load, e.g., A1, B1, of each of nets A and B requires one buffer, while the second load, e.g., A2, B2, of each of nets A and B requires two buffers. In the example, the requirement of having one buffer is met by allocating to the load the required number of buffers or more such buffers (e.g., one or more buffers in this example). Referring to the example of FIG. 15, a conventional router searches for buffers for net A prior to buffers for net B. This results in net A taking both of buffers 1506 and 1508, the two buffers closest to the first load A1 of net A. Next, the router routes net B and is forced to take a detour due to the routing of net A using the two closest buffers to load B1 and takes the buffers 1502 and 1504.

The detour needed to allocate the required buffers to net B uses additional routing resources, e.g., wires, that may add to the overall latency of the application. Such detours, which would be taken using a conventional router, may be avoided in accordance with the inventive arrangements described within this disclosure. For example, the detour illustrated in the example of FIG. 15 may be avoided by reconfiguring the router based on several different principles. These principles help the router avoid locally optimal buffer allocation solutions that are globally suboptimal. An example modification is one that causes the router to allow each of nets A and B to take only one of the two buffers from each FIFOs closest to each load pair. That is, the router permits net A to take only one of buffers 1506, 1508 and net B to taken only one of buffers 1502, 1504.

FIG. 7C illustrates example operations that may be performed to implement block 708 of FIG. 7A in an example implementation that uses a router to allocate buffers to nets of the application based on the compact DFG. That is, a router adapted for operation on a compact DFG may be used to implement buffer allocation engine 110. In the example of FIG. 7C, the router is used to find a solution for the buffer requirements. The router, for example, is capable of finding an assignment of buffers to nets necessary to meet the requirements.

In block 714, the router is configured to process loads of nets so that loads of a net with lower buffer requirements are routed prior to loads of the net with higher buffer requirements. Referring to the example of FIG. 16, in the case where each of loads A1 and B1 requires 1 buffer, while loads A2 and B2 require 2 buffers, the router is configured to route load A1 prior to load A2 when net A is selected for routing. Similarly, the router is configured to route load B1 prior to load B2 when net B is selected for routing.

In block 716, the router is configured to use a cost function that prefers using buffers that are already taken, or allocated to a load, before adding a detour to take another buffer not yet taken. The cost function may be updated from one iteration of the router to the next such that detours are gradually penalized less from one iteration of the router to the next. This cost scheduling, e.g., the changing of the cost function from one iteration to the next, has the effect of gradually allowing additional detours from one iteration to the next sequential iteration to avoid having large jumps in the number of detours added between consecutive iterations.

In block 718, the router routes nets of the application using the ordering of loads described in connection with block 714 and the cost measures described in connection with 716. Further, the router may perform a plurality of iterations of determining a buffer allocation for the application. In performing a plurality of different iterations, the router is capable of changing the order of nets that are processed each set of N iteration(s), where N is an integer value of 1 or more. Changing the order of processing of nets each iteration or each set of N iterations prevents the same net from always being processed first and prevents the router from processing the nets of the application in the same order. By changing the order in which the nets are processed, the router may avoid getting stuck in a local minima in consequence of net ordering while also maintaining deterministic results.

Figure 16:
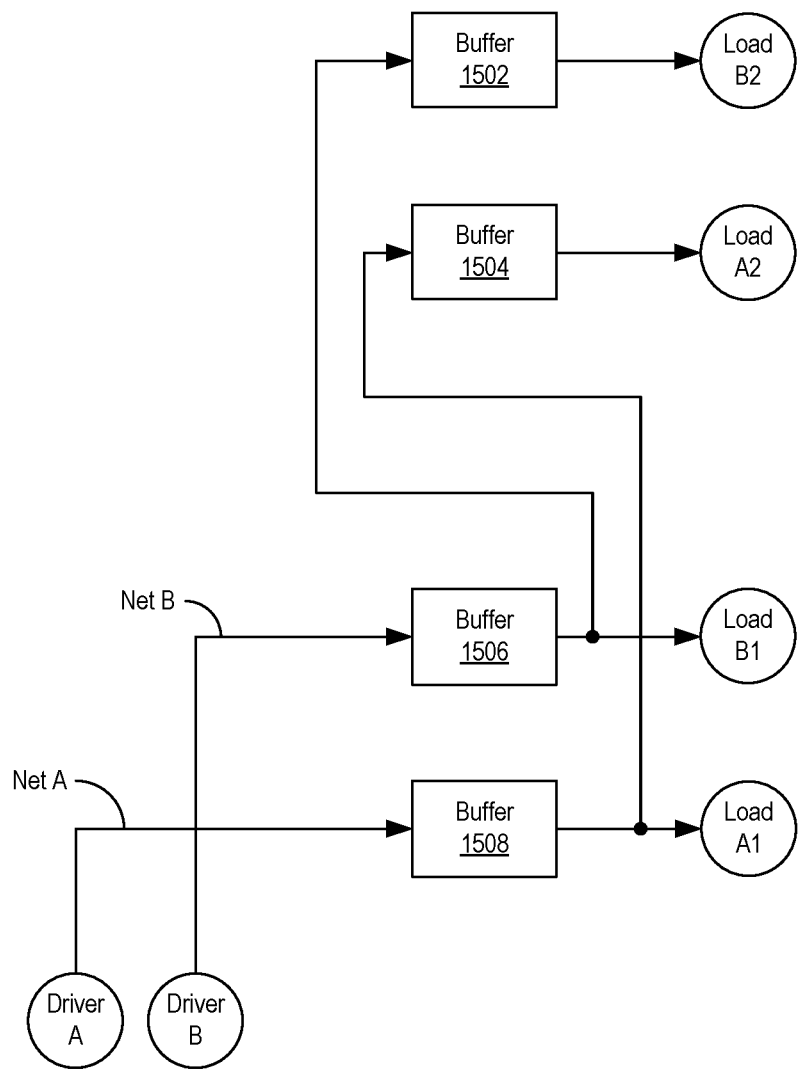
FIG. 16 illustrates an example buffer allocation generated by a router adapted to utilize a compact DFG in accordance with the inventive arrangements described herein.

In implementing the operations described in the example of FIG. 7C, a router is capable of routing nets A and B of an application to avoid the disadvantages illustrated in FIG. 15 and arrive at the improved buffer allocation illustrated in FIG. 16.

Figure 17:
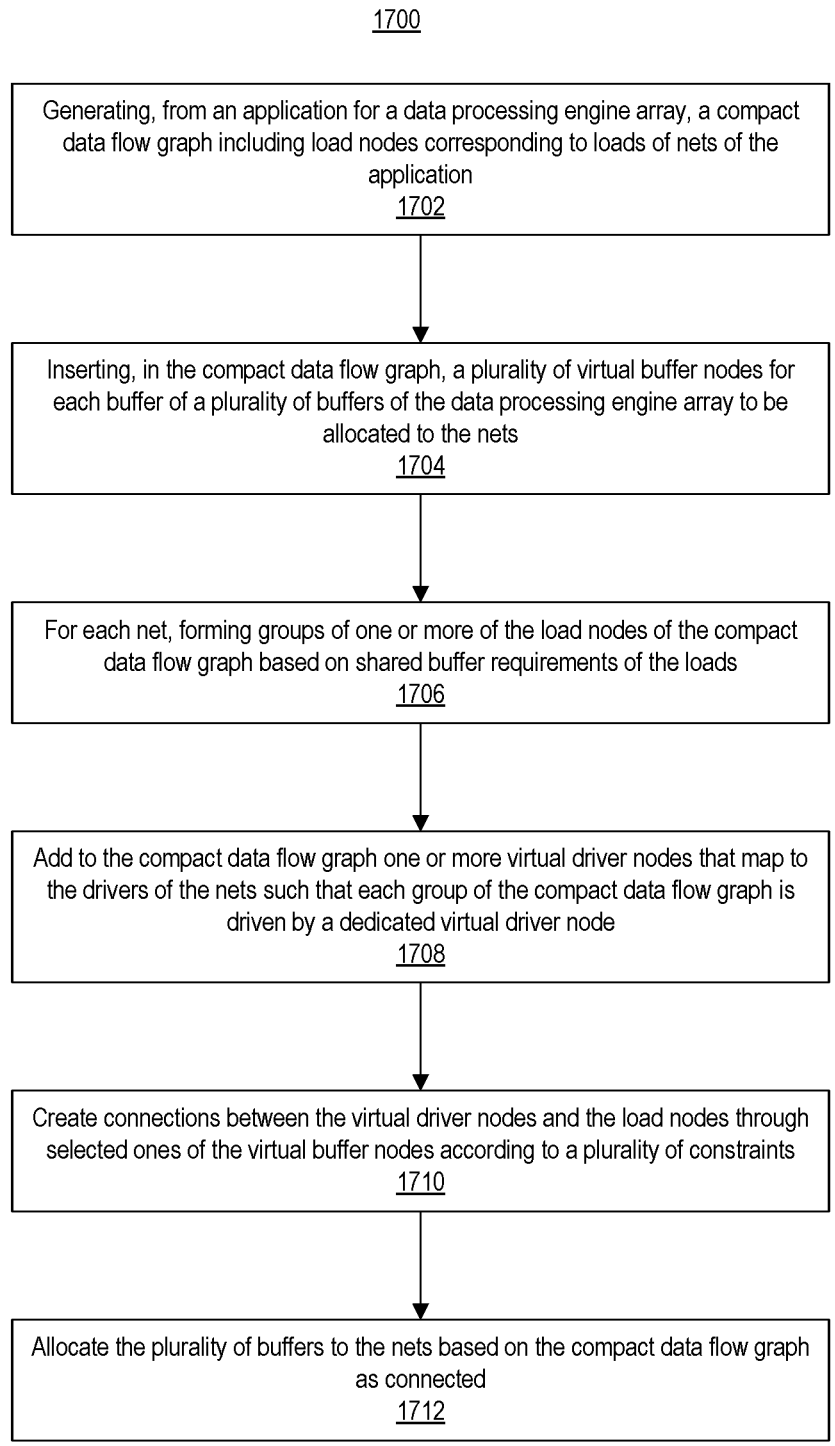
FIG. 17 illustrates another example method of implementing an application in a DPE array.

FIG. 17 illustrates another example method 1700 of implementing an application in a DPE array. More particularly, method 1700 illustrates an example method of allocating buffers to nets of the application during a compilation process for the application as performed by an EDA system. Method 1700 may begin in a state where the kernels, e.g., the drivers and loads of nets of the application, have been placed or mapped to particular DPEs of the DPE array.

In block 1702, the EDA system is capable of generating, from the application for the DPE array, a compact DFG including load nodes corresponding to loads of nets of the application. In block 1704, the EDA system is capable of inserting, in the compact DFG, a plurality of virtual buffer nodes for each buffer of a plurality of buffers of the DPE array to be allocated to the nets. In block 1706, the EDA system is capable of forming groups of one or more of the load nodes of the compact DFG based on shared buffer requirements of the loads on a per net basis. In block 1708, the EDA system is capable of adding to the compact DFG one or more virtual driver nodes that map to the drivers of the nets such that each group of the compact DFG is driven by a dedicated virtual driver node. In block 1710, the EDA system is capable of creating connections between the virtual driver nodes and the load nodes through selected ones of the virtual buffer nodes according to a plurality of constraints. In block 1712, the EDA system is capable of allocating the plurality of buffers to the nets based on the compact DFG as connected.

The foregoing and other implementations can each optionally include one or more of the following features, alone or in combination. Some example implementations include all the following features in combination.

In one aspect, a total number of the virtual buffer nodes of the compact DFG depends on a largest buffer requirement of any net of the application and a total number of buffers seen by all nets of the application.

In another aspect, the largest buffer requirement of any net of the application specifies a number of layers of the virtual buffer nodes of the compact DFG and the total number of buffers seen by all nets of the application specifies a number of rows of the virtual buffer nodes of the compact DFG.

In another aspect, each load node of the compact DFG corresponds to a load of the application on a one-to-one basis.

In another aspect, the creating connections includes fully connecting the compact DFG and pruning one or more connections between the virtual driver nodes and the load nodes based on the constraints. The constraints define which virtual buffer nodes are available to each net.

In another aspect, the allocating the plurality of buffers includes generating an ILP formulation from the compact DFG as connected. The ILP formulation includes a plurality of equations for allocating the plurality of buffers to the nets. The allocating further includes solving the ILP using a cost function minimizing detour cost.

In another aspect, the minimizing detour cost includes minimizing a maximum detour cost for each subnet of the compact DFG, wherein each subnet corresponds to a group, and minimizing a total detour cost across all subnets of the compact DFG.

In another aspect, the cost function includes minimizing a number of the plurality of buffers allocated.

In another aspect, a router is used to determine the allocation of the plurality of buffers. The router may be configured to use a cost function that decreases an amount by which detours are penalized over a plurality of iterations. The router also may be configured to allocate buffers for loads of nets with lower buffer requirements prior to allocating buffers to loads of the nets with higher buffer requirements. The router also may be configured to change an order in which nets of the application are processed for buffer allocation over the plurality of iterations.

In one or more example implementations, the EDA system is capable of routing the application based on the determined buffer allocation. Further, the EDA system is capable of generating object code and configuration data to implement the application in the DPE array. The object code and configuration data are loadable within the DPE array to execute the application therein.

Figure 18:
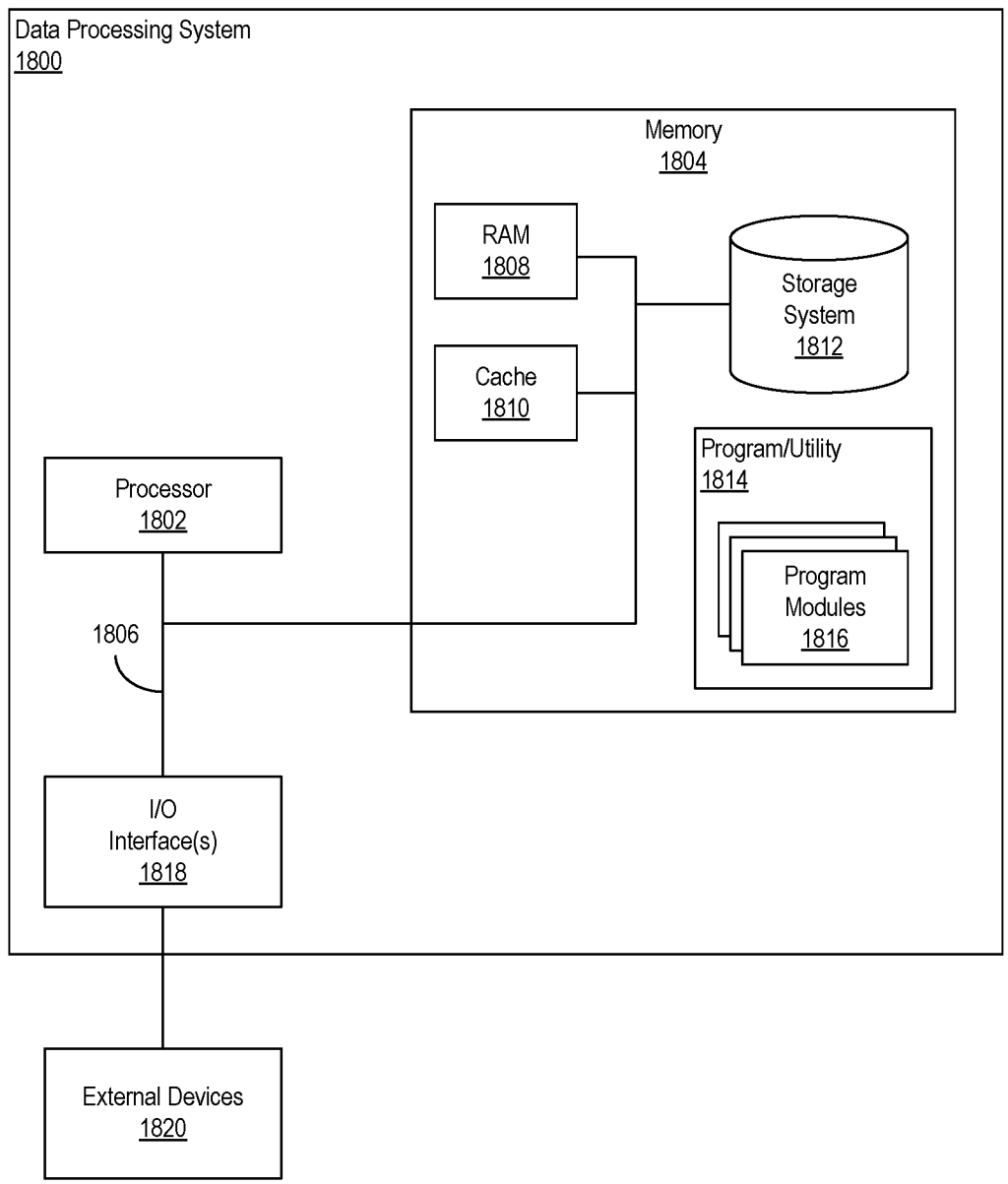
FIG. 18 illustrates an example data processing system for use with the inventive arrangements described within this disclosure.

FIG. 18 illustrates an example implementation of a data processing system 1800. As defined herein, "data processing system" means one or more hardware systems configured to process data, each hardware system including at least one processor programmed to initiate operations and memory.

The components of data processing system 1800 can include, but are not limited to, a processor 1802, a memory 1804, and a bus 1806 that couples various system components including memory 1804 to processor 1802. Processor 1802 may be implemented as one or more processors. In an example, processor 1802 is implemented as a central processing unit (CPU). As defined herein, the term "processor" means at least one circuit capable of carrying out instructions contained in program code. The circuit may be an integrated circuit or embedded in an integrated circuit. Processor 1802 may be implemented using a complex instruction set computer architecture (CISC), a reduced instruction set computer architecture (RISC), a vector processing architecture, or other known architectures. Example processors include, but are not limited to, processors having an ×86 type of architecture (IA-32, IA-64, etc.), Power Architecture, ARM processors, and the like.

Bus 1806 represents one or more of any of a variety of communication bus structures. By way of example, and not limitation, bus 1806 may be implemented as a Peripheral Component Interconnect Express (PCIe) bus. Data processing system 1800 typically includes a variety of computer system readable media. Such media may include computer-readable volatile and non-volatile media and computer-readable removable and non-removable media.

Memory 1804 can include computer-readable media in the form of volatile memory, such as random-access memory (RAM) 1808 and/or cache memory 1810. Data processing system 1800 also can include other removable/non-removable, volatile/non-volatile computer storage media. By way of example, storage system 1812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1806 by one or more data media interfaces. Memory 1804 is an example of at least one computer program product.

Program/utility 1814, having a set (at least one) of program modules 1816, may be stored in memory 1804. Program/utility 1814 is executable by processor 1802. By way of example, program modules 1816 may represent an operating system, one or more application programs, other program modules, and program data. Program modules 1816, upon execution, cause data processing system 1800, e.g., processor 1802, to carry out the functions and/or methodologies of the example implementations described within this disclosure. Program/utility 1814 and any data items used, generated, and/or operated upon by data processing system 1800 are functional data structures that impart functionality when employed by data processing system 1800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

For example, one or more program modules 1816, when executed, may implement an EDA system as described herein. Program modules 1816, as part of implementing an EDA system, may include software that is capable of performing one or more or all operations of a design flow. These operations may include, but are not limited to, synthesis, placement (e.g., mapping), buffer allocation, and/or routing for an application and/or circuit design or portion thereof so that the application and/or circuit design may be physically realized in an IC. A compact DFG and a buffer allocation are examples of data structures.

Data processing system 1800 may include one or more Input/Output (I/O) interfaces 1818 communicatively linked to bus 1806. I/O interface(s) 1818 allow data processing system 1800 to communicate with one or more external devices 1820 and/or communicate over one or more networks such as a local area network (LAN), a wide area network (WAN), and/or a public network (e.g., the Internet). Examples of I/O interfaces 1818 may include, but are not limited to, network cards, modems, network adapters, hardware controllers, etc. Examples of external devices also may include devices that allow a user to interact with data processing system 1800 (e.g., a display, a keyboard, and/or a pointing device) and/or other devices such as accelerator card.

Data processing system 1800 is only one example implementation. Data processing system 1800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 18 is not intended to suggest any limitation as to the scope of use or functionality of example implementations described herein. Data processing system 1800 is an example of computer hardware that is capable of performing the various operations described within this disclosure. In this regard, data processing system 1800 may include fewer components than shown or additional components not illustrated in FIG. 18 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1800 may be operational with numerous other general-purpose or special-purpose computing system environments or configurations. Examples of computing systems, environments, and/or configurations that may be suitable for use with data processing system 1800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1800 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
generating, from an application for a data processing engine array, a compact data flow graph including load nodes corresponding to loads of nets of the application;
inserting, in the compact data flow graph, a plurality of virtual buffer nodes for each buffer of a plurality of buffers of the data processing engine array to be allocated to the nets of the application;
forming groups of one or more of the load nodes of the compact data flow graph based on shared buffer requirements of the loads of the nets of the application on a per net basis;
adding, to the compact data flow graph, one or more virtual driver nodes that map to drivers of the nets of the application such that each of the groups of the load nodes of the compact data flow graph is driven by a dedicated virtual driver node of the one or more virtual driver nodes;
creating, in the compact data flow graph, connections between the one or more virtual driver nodes and the load nodes through selected ones of the plurality of virtual buffer nodes according to a plurality of constraints; and
allocating the plurality of buffers to the nets of the application based on the compact data flow graph as connected.

2. The method of claim 1, wherein a total number of the plurality of virtual buffer nodes of the compact data flow graph depends on a largest buffer requirement of any of the nets of the application and a total number of buffers seen by all of the nets of the application.

3. The method of claim 2, wherein the largest buffer requirement of any of the nets of the application specifies a number of layers of the plurality of virtual buffer nodes of the compact data flow graph and the total number of buffers seen by all of the nets of the application specifies a number of rows of the plurality of virtual buffer nodes of the compact data flow graph.

4. The method of claim 1, wherein each of the load nodes of the compact data flow graph corresponds to a load of the application on a one-to-one basis.

5. The method of claim 1, wherein the creating connections comprises:
fully connecting the compact data flow graph; and pruning one or more of the connections between the one or more virtual driver nodes and the load nodes based on the plurality of constraints, wherein the plurality of constraints define which virtual buffer nodes are available to each of the nets of the application.

6. The method of claim 1, wherein the allocating the plurality of buffers comprises:
generating an Integer Linear Programming formulation from the compact data flow graph as connected, wherein the Integer Linear Programing formulation includes a plurality of equations for allocating the plurality of buffers to the nets of the application; and
solving the Integer Linear Programming Formulation using a cost function minimizing detour cost.

7. The method of claim 6, wherein the minimizing detour cost includes minimizing a maximum detour cost for each subnet of the compact data flow graph, wherein each subnet corresponds to a group, and minimizing a total detour cost across all subnets of the compact data flow graph.

8. The method of claim 6, wherein the cost function includes minimizing a number of the plurality of buffers allocated.

9. The method of claim 1, wherein a router is used to perform the allocating the plurality of buffers, wherein the router:
uses a cost function that decreases an amount by which detours are penalized over a plurality of iterations;
allocates buffers for the loads of the nets of the application with lower buffer requirements prior to allocating buffers for the loads of the nets of the application with higher buffer requirements; and
changes an order in which the nets of the application are processed for buffer allocation over the plurality of iterations.

10. A system, comprising:
one or more processors configured to initiate operations including:
generating, from an application for a data processing engine array, a compact data flow graph including load nodes corresponding to loads of nets of the application;
inserting, in the compact data flow graph, a plurality of virtual buffer nodes for each buffer of a plurality of buffers of the data processing engine array to be allocated to the nets of the application;
forming groups of one or more of the load nodes of the compact data flow graph based on shared buffer requirements of the loads on a per net basis;
adding to the compact data flow graph one or more virtual driver nodes that map to drivers of the nets of the application such that each group of the groups of the load nodes of the compact data flow graph is driven by a dedicated virtual driver node of the one or more virtual driver nodes;
creating, in the compact data flow graph, connections between the one or more virtual driver nodes and the load nodes through selected ones of the plurality of virtual buffer nodes according to a plurality of constraints; and
allocating the plurality of buffers to the nets of the application based on the compact data flow graph as connected.

11. The system of claim 10, wherein a total number of the plurality of virtual buffer nodes of the compact data flow graph depends on a largest buffer requirement of any of the nets of the application and a total number of buffers seen by all of the nets of the application.

12. The system of claim 11, wherein the largest buffer requirement of any of the nets of the application specifies a number of layers of the plurality of virtual buffer nodes of the compact data flow graph and the total number of buffers seen by all of the nets of the application specifies a number of rows of the plurality of virtual buffer nodes of the compact data flow graph.

13. The system of claim 10, wherein each of the load nodes of the compact data flow graph corresponds to a load of the application on a one-to-one basis.

14. The system of claim 10, wherein the creating connections comprises:
fully connecting the compact data flow graph; and
pruning one or more of the connections between the one or more virtual driver nodes and the load nodes based on the plurality of constraints, wherein the plurality of constraints define which virtual buffer nodes are available to each of the nets of the application.

15. The system of claim 10, wherein the allocating the plurality of buffers comprises:
generating an Integer Linear Programming formulation from the compact data flow graph as connected, wherein the Integer Linear Programing formulation includes a plurality of equations for allocating the plurality of buffers to the nets of the application; and
solving the Integer Linear Programming Formulation using a cost function minimizing detour cost.

16. The system of claim 15, wherein the minimizing detour cost includes minimizing a maximum detour cost for each subnet of each group of the compact data flow graph and minimizing a total detour cost across all subnets of the compact data flow graph.

17. The system of claim 15, wherein the cost function includes minimizing a number of the plurality of buffers allocated.

18. The system of claim 10, wherein a router is used to perform the allocating the plurality of buffers, wherein the router:
uses a cost function that decreases an amount by which detours are penalized over a plurality of iterations;
allocates buffers for the loads of the nets of the application with lower buffer requirements prior to allocating buffers for the loads of the nets of the application with higher buffer requirements; and
changes an order in which the nets of the application are processed for buffer allocation over the plurality of iterations.

19. A computer program product, comprising:
one or more non-transitory computer readable storage media, and program instructions collectively stored on the one or more non-transitory computer readable storage media, wherein the program instructions are executable by computer hardware to initiate operations including:
generating, from an application for a data processing engine array, a compact data flow graph including load nodes corresponding to loads of nets of the application;
inserting, in the compact data flow graph, a plurality of virtual buffer nodes for each buffer of a plurality of buffers of the data processing engine array to be allocated to the nets of the application;
forming groups of one or more of the load nodes of the compact data flow graph based on shared buffer requirements of the loads of the nets of the application on a per net basis;
adding to the compact data flow graph one or more virtual driver nodes that map to drivers of the nets of the application such that each group of the groups of the load nodes of the compact data flow graph is driven by a dedicated virtual driver node of the one or more virtual driver nodes;

creating, in the compact data flow graph, connections between the one or more virtual driver nodes and the load nodes through selected ones of the plurality of virtual buffer nodes according to a plurality of constraints; and allocating the plurality of buffers to the nets of the application based on the compact data flow graph as connected.

20. The computer program product of claim 19, wherein the allocating the plurality of buffers comprises:

generating an Integer Linear Programming formulation from the compact data flow graph as connected, wherein the Integer Linear Programing formulation includes a plurality of equations for allocating the plurality of buffers to the nets of the application and solving the Integer Linear Programming Formulation using a cost function minimizing detour cost; or using a router to perform the allocating the plurality of buffers, wherein the router, uses a cost function that decreases an amount by which detours are penalized over a plurality of iterations, allocates buffers for the loads of the nets of the application with lower buffer requirements prior to allocating buffers for the loads of the nets of the application with higher buffer requirements, and changes an order in which the nets of the application are processed for buffer allocation over the plurality of iterations.

* * * * *

UNITED STATES PATENT AND TRADEMARK OFFICE
CERTIFICATE OF CORRECTION

| | |
|---|---|
| PATENT NO. | : 11,733,980 B2 |
| APPLICATION NO. | : 17/643622 |
| DATED | : August 22, 2023 |
| INVENTOR(S) | : Brian Guttag |

It is certified that error appears in the above-identified patent and that said Letters Patent is hereby corrected as shown below:

In the Claims

In Column 29, Claim 10, Line 51, "application such that each group of the groups of the" should read --application such that each of the groups of the--.

In Column 31, Claim 19, Line 1, "application such that each group of the groups of the" should read --application such that each of the groups of the--.

Signed and Sealed this
Third Day of October, 2023

Katherine Kelly Vidal
*Director of the United States Patent and Trademark Office*